(12) United States Patent
Powell

(10) Patent No.: US 7,425,888 B2
(45) Date of Patent: Sep. 16, 2008

(54) METHODS FOR OPTIMIZING COMMUNICATIONS BETWEEN AN RFID READER AND A TAG POPULATION USING NON-SEQUENTIAL MASKING

(75) Inventor: Kevin J. Powell, Annapolis, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 529 days.

(21) Appl. No.: 11/192,373

(22) Filed: Jul. 29, 2005

(65) Prior Publication Data
US 2007/0024424 A1 Feb. 1, 2007

(51) Int. Cl.
H04Q 5/22 (2006.01)

(52) U.S. Cl. .................. 340/10.2; 340/10.1; 340/10.32; 340/10.52; 340/5.3

(58) Field of Classification Search ................ 340/10.2, 340/10.1, 10.31, 10.32, 5.3, 10.52
See application file for complete search history.

(56) References Cited

U.S. PATENT DOCUMENTS

| | | | |
|---|---|---|---|
| 5,841,770 A * | 11/1998 | Snodgrass et al. | 370/346 |
| 5,995,019 A | 11/1999 | Chieu et al. | |
| 6,002,344 A | 12/1999 | Bandy et al. | |
| 6,107,910 A | 8/2000 | Nysen | |
| 6,265,963 B1 * | 7/2001 | Wood, Jr. | 340/10.4 |
| 6,433,671 B1 | 8/2002 | Nysen | |
| 6,531,954 B1 * | 3/2003 | Kim | 340/5.21 |
| 6,531,957 B1 | 3/2003 | Nysen | |
| 6,580,358 B1 | 6/2003 | Nysen | |
| 6,950,009 B1 | 9/2005 | Nysen | |
| 7,035,818 B1 | 4/2006 | Bandy et al. | |
| 7,057,511 B2 | 6/2006 | Shanks et al. | |
| 7,075,436 B2 | 7/2006 | Shanks et al. | |

* cited by examiner

Primary Examiner—George A Bugg
Assistant Examiner—Hoi C Lau
(74) Attorney, Agent, or Firm—Sterne, Kessler, Goldstein & Fox P.L.L.C.

(57) ABSTRACT

System and methods for optimizing communications between an RFID reader and a population of tags are described. To minimize the amount of data exchanges, the reader and tags use non-sequential bit string or byte masking. In non-sequential bit string masking, the reader transmits an interrogation mask having a plurality of non-sequential sub-masks to the tags. During subsequent collection of the identification sequence, the reader and tags only exchange the non-masked bit positions. The interrogation mask can be determined using superposition processing, historical tendencies, or known identification and/or subset of identification ranges. During superposition processing, the reader determines whether a bit position contains a single value or multiple values for tags in the tag population. If the bit position contains a single value, the bit position is designated as masked. If the bit position contains multiple values, the bit position is designated as non-masked.

21 Claims, 15 Drawing Sheets

| bit position | 0 | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|---|
| Tag 102a | 0 | 1 | 0 | 0 | 0 | 0 | 1 | 1 | 1 | 1 | 0 | 0 | 0 | 0 | 1 | 0 | 602a |
| Tag 102b | 0 | 1 | 0 | 0 | 0 | 1 | 0 | 1 | 1 | 1 | 1 | 1 | 0 | 0 | 0 | 0 | 602b |
| Tag 102c | 0 | 1 | 0 | 0 | 1 | 0 | 1 | 0 | 1 | 1 | 1 | 0 | 0 | 1 | 1 | 1 | 602c |
| Superposition Collection | 0 | 1 | 0 | 0 | X | X | X | X | 1 | 1 | X | X | 0 | X | X | X | 610 |

620 groups Tag 102a, 102b, 102c.

X = both 0/1 received

| MASK | 0 | 0 | 0 | 0 | 1 | 1 | 1 | 1 | 0 | 0 | 1 | 1 | 0 | 1 | 1 | 1 | 600 |
|---|---|---|---|---|---|---|---|---|---|---|---|---|---|---|---|---|---|

604a, 604b, 604c

MASKED TRAVERSAL:

| Tag 102a | 0 | 0 | 1 | 1 | 0 | 0 | 0 | 1 | 0 | 630a |
|---|---|---|---|---|---|---|---|---|---|---|
| Tag 102b | 0 | 1 | 0 | 1 | 1 | 1 | 0 | 0 | 0 | 630b |
| Tag 102c | 1 | 0 | 1 | 0 | 1 | 0 | 1 | 1 | 1 | 630c |

FIG. 6

METHODS FOR OPTIMIZING COMMUNICATIONS BETWEEN AN RFID READER AND A TAG POPULATION USING NON-SEQUENTIAL MASKING

FIELD OF THE INVENTION

The present invention is related to systems and methods for communicating between radio frequency identification (RFID) tags and an RFID reader.

BACKGROUND OF THE INVENTION

In an RFID system, an RFID reader may be required to communicate with a large number of different RFID tags within a given communication range. Where each of the different RFID tags is identified by a unique identification number, it is imperative that the RFID reader be able to quickly and accurately read the identification number associated with each tag.

One major application of RFID systems is electronic inventory. In modern business, maintaining an accurate inventory of merchandise is crucial. In the past, taking inventory was an entirely manual process, and therefore slow and expensive. In an RFID electronic inventory system, an RFID tag is attached to each item to be inventoried. Each RFID tag is assigned a unique tag identification number.

In typical inventory applications, a large number of tagged items are stacked on a pallet. For example, a single pallet may have 50 boxes containing Product X and 50 boxes containing Product Y. The tags associated with Product X will have similar tag identification sequences and the tags associated with Product Y will have similar tag identification sequences. For example, Product X tag identification sequences will cluster at one section of a binary tree and Product Y tag identification sequences will cluster at a different section of a binary tree.

Existing techniques to increase read rate by capitalizing on the clustering of tags use a masking technique on the information transmitted. However, the masking technique only allows for a single sequential bit string in a tag identification sequence to be masked efficiently. Masking multiple non-sequential bit strings requires complicated mechanisms for defining the sub-masks and appending the sub-masks into a single command.

Consequently, a need exists for a technique that permits an RFID reader to efficiently read a population of RFID tags in a manner that optimally utilizes information about the tag population gained by the RFID reader, other RFID readers, or other systems compiling information for RFID readers, during or before the reading process.

A further need exists for a method of communicating between an RFID reader and a population of RFID tags that minimizes the data exchanged between a reader and tags and/or maximizes the read rate of a population of RFID tags.

BRIEF SUMMARY OF THE INVENTION

The present invention is directed to a system and method for optimizing communication between an RFID reader and a population of RFID tags using non-sequential bit string masking. In accordance with aspects of the invention, the RFID system includes one or more readers and a plurality of tags.

In accordance with an aspect of the present invention, a reader transmits an interrogation mask corresponding to the tag identification sequence to a tag population. The interrogation mask includes a plurality of sub-masks that are non-sequentially positioned in the mask. The interrogation mask can be determined using superposition processing, for example, or directed from an application with apriori knowledge of the anticipated tag population. The reader then performs an abbreviated collection of the unmasked bits of the identification sequence from one or more tags in the tag population. The collection may be performed using a binary tree traversal protocol, a slot-based protocol, or other protocols known to persons skilled in the art.

In another aspect of the invention, an RFID tag receives an interrogation mask having a plurality of sub-masks that are non-sequentially positioned in the mask. The interrogation mask can be received during superposition processing. Alternatively, the interrogation mask can be sent using a separate masking command. Upon receiving the interrogation mask, the tag engages in an abbreviated collection of its unmasked bits with the reader. The collection may be performed using a binary tree traversal protocol, a slot-based protocol, or other protocols known to persons skilled in the art.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 6 depicts an exemplary 16-bit mask having non-sequential sub-masks, according to an embodiment of the present invention.

Figure 1:
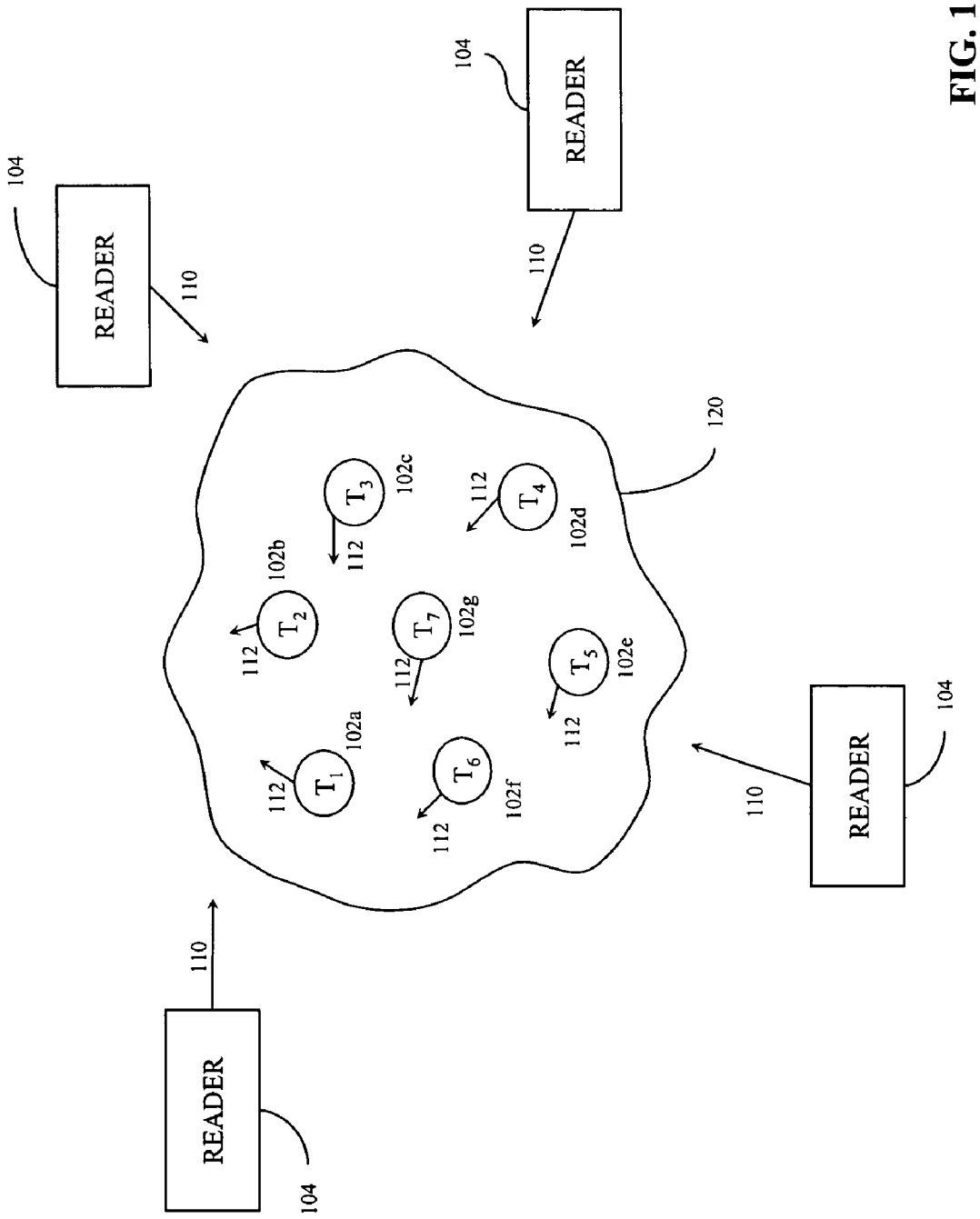
FIG. 1 illustrates an environment where one or more RFID tag readers communicate with an exemplary population of RFID tags, according to the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Overview 1.1 Tag Interrogation Environment

Before describing the present invention in detail, it is helpful to describe an example environment in which the invention may be implemented. The present invention is particularly useful for improving the efficiency of interrogations in radio frequency identification (RFID) applications. FIG. 1 illustrates an environment 100 where one or more RFID tag readers 104 communicate with an exemplary population of RFID tags 120, according to the present invention. As shown in FIG. 1, the population of tags 120 includes seven tags 102a-102g. According to embodiments of the present invention, a population of tags 120 may include any number of tags 102. In some embodiments, a very large numbers of tags 102 may be included in a population of tags 120, including hundreds, thousands, or even more.

Exemplary environment 100 also includes one or more readers 104. These readers 104 may operate independently or may be coupled together to form a reader network. A reader 104 may be requested by an external application to address the population of tags 120. Alternatively, the reader may have internal logic that initiates communication. When the reader is not communicating with the population of tags, the reader 104 typically does not emit RF energy, or if so emits energy in power less than what would interfere with other reader communications upon the tags 120. This allows other readers to act upon the same population of tags, but from a different orientation, so as to achieve as complete of coverage with RF signals into the entire population of tags as possible. In addition, the same reader may act upon the same population of tags using a different frequency to increase tag coverage.

According to the present invention, signals 110 and 112 are exchanged between a reader 104 and the tags 102 according to one or more interrogation protocols. An exemplary interrogation protocol is the binary tree traversal protocol described below. Signals 110 and 112 are wireless signals, such as radio frequency (RF) transmissions. Upon receiving a signal 110, a tag 102 may produce a responding signal 112 by alternatively reflecting and absorbing portions of signal 110 according to a time-based pattern or frequency. This technique for alternatively absorbing and reflecting signal 110 is referred to herein as backscatter modulation. The present invention is also applicable to RFID tags that communicate in other ways.

1.2 Tag Embodiments 1.2.1 Structural Overview

Figure 2:
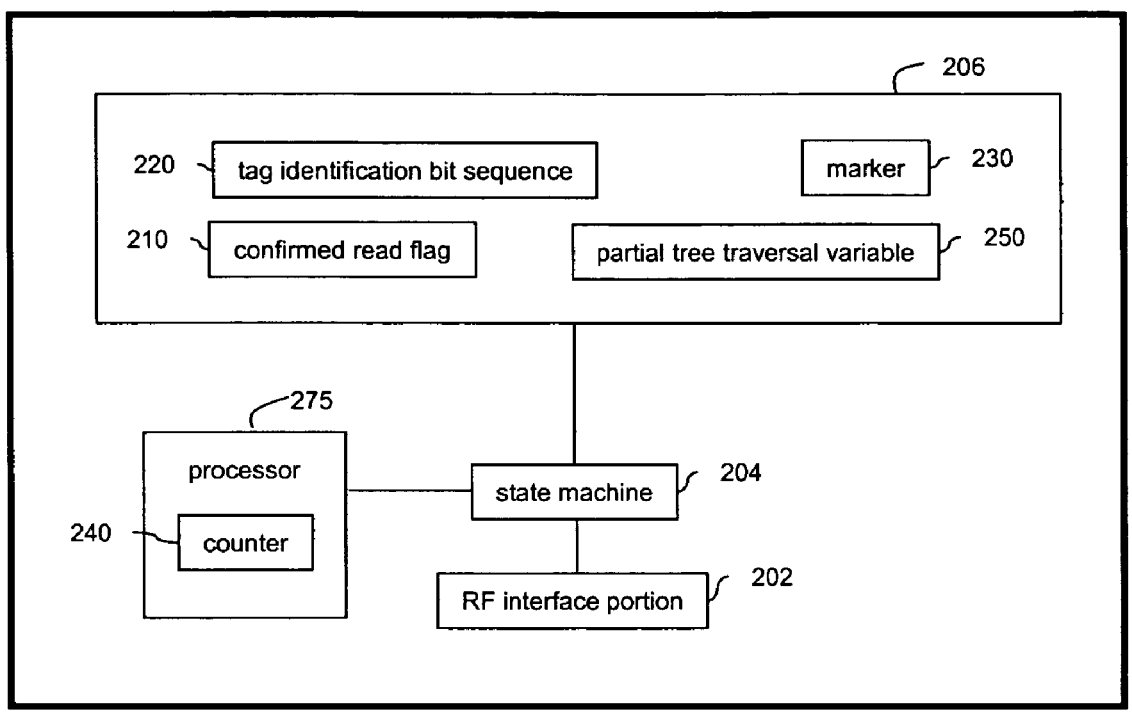
FIG. 2 is a block diagram of a tag, according to an example embodiment of the present invention.

FIG. 2 is a block diagram of a tag 102, according to an example embodiment of the present invention. Tag 102 includes an RF interface portion 202, a state machine 204, a processor 275, and a data storage section 206. Data storage section 206 may include one or more memory elements as required by a particular application. Processor 275 includes a null counter 240. Data storage section 206 stores information used by tag 102 during communication with reader 104. In an embodiment, information stored in data storage module 206 includes a confirmed read flag, a tag identification number 220, an optional marker 230, and an optional partial tree traversal variable 250.

Tag 102 is identified by a tag identification bit sequence. The tag identification bit sequence may be permanently stored or may be temporarily stored in memory in data storage section 206. In an embodiment, tag identification bit sequences are hierarchical. That is, for a tag population, a subset of the tag identification bit sequence is identical for all tags in a tag population. Thus, in such an embodiment, for a tag population 120, reader 104 does not need to negotiate the entire identification bit sequence to identify each tag in the tag population. For example, a tag identification sequence may consist of a manufacturer bit string, a lot number bit string, and tag ID bit string. In this example, all tags in a tag population 120 may have the same manufacturer bit string and a subset of all tags in tag population 120 will have the same lot number bit string. The tag ID bit string is then the uniqueness element for each tag in the tag population.

The confirmed read flag 210 indicates whether tag 102 has been successfully read during a binary tree traversal. Flag 210 is stored in a memory in data storage section 206. In an embodiment, the confirmed read flag 210 retains its value for a period of time regardless of whether tag 102 experiences a power loss.

When present, marker 230 indicates the bit position to be used as the first bit position during a binary tree traversal. In an embodiment, marker 230 is stored when tag 102 receives a set marker command from a reader during a partial binary tree traversal. In an alternate embodiment, tag 102 always stores marker 230. During a full binary tree traversal, marker 230 is set to the first bit position in the tag identification bit sequence.

When present, null count match variable 250 indicates a number of designated symbols, such as the number of NULL symbols, which must be received from a reader in order for tag 102 to perform partial binary tree traversal. In an embodiment, the value of null counter match variable 250 is set via a command from reader 104. In this embodiment, reader 104 can flexibly determine the value to be used to initiate partial tree traversal of matched tags. In an alternate embodiment, the value of null counter match variable 250 is set to a specific value.

Processor 275 includes a counter 240. In an embodiment, counter 240 is cleared when a NULL symbol is received from reader 104 causing tag 102 to transition from traversal mute state 314 to tree start state 310. Counter 240 is then incremented each time a successive NULL symbol is received from reader 104 when tag 102 is in tree start state until counter 240 equals the value of null counter match variable 250. As would be appreciated by a person of skill in the art, counter 240 could be implemented such that counter 240 is set to the value of null counter match variable 250 when tag 102 is in a tree traversal state. Counter 240 is then decremented each time a successive NULL symbol is received from reader 104 when tag 102 is in tree start state until counter 240 equals zero. Additional alternative implementations for processor 275/counter 240 would be known to a person of ordinary skill in the art.

Note that the use of the terminology "counter" is not intended to imply a specific implementation. Each counter can be implemented as a register or in another manner including hardware, software, firmware, state machine, or any combination thereof.

RF interface portion 202, together with tag antenna(s) (not shown), provide a bi-directional communications interface with reader 104. The RF interface receives RF signals from reader 104 and demodulates the signals into digital information symbols. The RF interface also modulates digital information symbols into RF signals.

State machine 204 may include logic, a processor (including processor 275), and/or other components that control the operation of tag 102. State machine 204 receives demodulated information symbols from RF interface portion 202. State machine 204 also accesses information in data storage section 206 as needed. In an embodiment, state machine 204 is implemented with digital circuitry, such as logic gates. Further details regarding state machine 204 are provided below with reference to FIG. 3.

1.2.2 Operational States of a Tag

Tag 102 can exist in various operating states. Each of these operating states describes a mode of operation for tag 102. Upon the occurrence of certain events, tag 102 can transition from one operating state to another. For example, upon occurrence of an event, tag 102 can transition from a present operating state, which is the state that tag 102 is operating in prior to when the event occurs, to a new operating state, as dictated by the combination of the present operating state and the event.

Events can be triggered by detection of edges in the transmission from reader 104, by passage of a defined period of time, by occurrence of one or more conditions, or by a combination of edge detection, time passage, and/or occurrence of one or more conditions. Examples of events include master reset event, master dormant event, and a data 0, 1, and "NULL."

Figure 3:
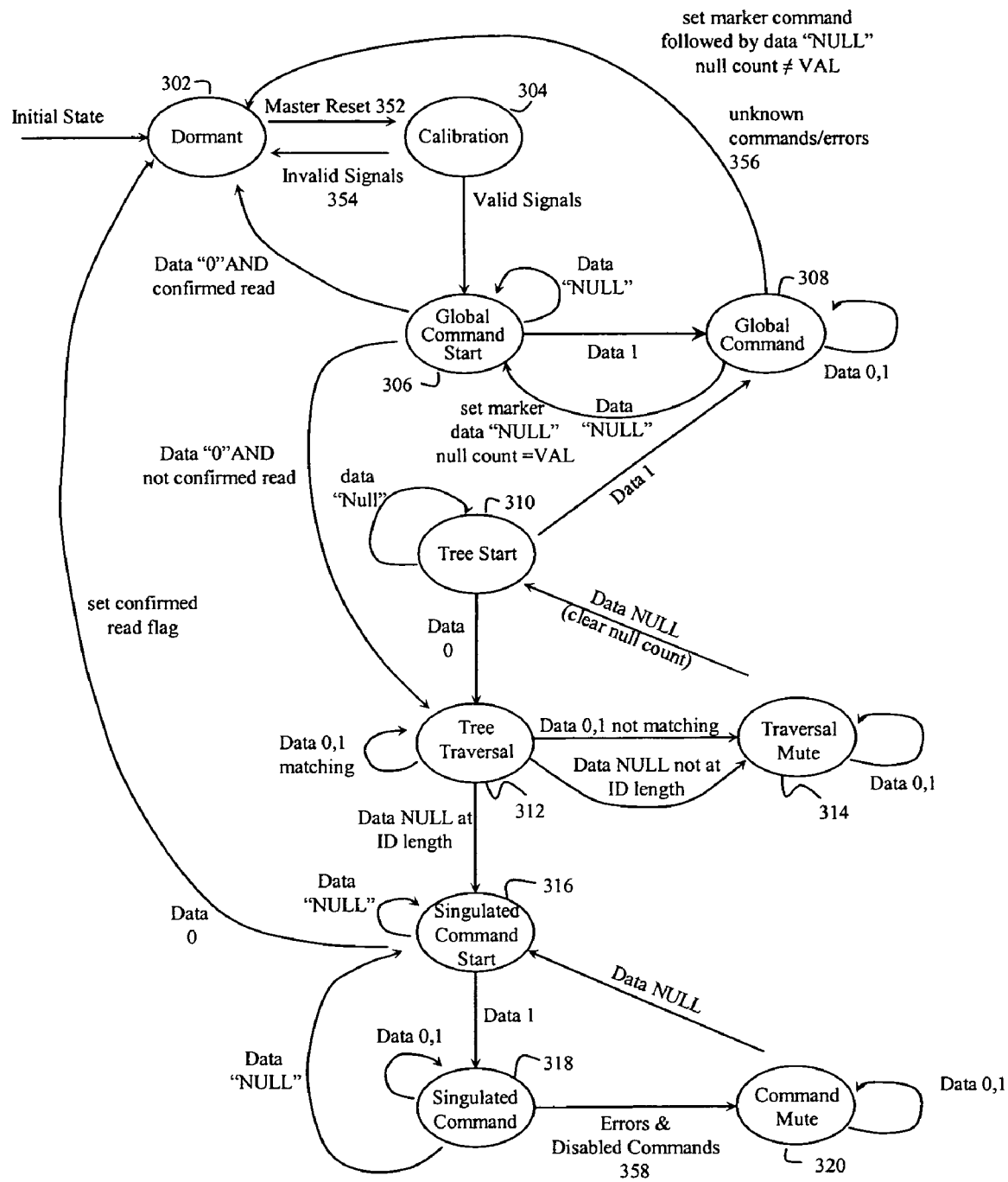
FIG. 3 illustrates various operating states in a state diagram for tag, according to an embodiment of the present invention.

FIG. 3 illustrates various operating states in a state diagram for tag 102, according to an embodiment of the present invention. In FIG. 3, each operating state is shown as an oval, and transitions between operating states are shown as connections between the ovals. The transitions are annotated with text that describes a corresponding event.

The paragraphs below describe the operating states and the respective transitions shown in FIG. 3. These particular states and transitions are presented by way of example only. Additional and alternative operating states, transitions, and transition causing events can be employed without departing from the spirit and scope of the present invention.

The first state is dormant state 302. During dormant state 302, tag 102 is largely inactive. Therefore, power is conserved while tag 102 is in dormant state. Tag 102 enters dormant state upon powering up, after receipt of a master dormant event, and at other times described below.

As shown in FIG. 3, tag 102 transitions from dormant state 302 to calibration state 304 upon a master reset event 352. In an embodiment, tag 102 can only transition to calibration state 304 from dormant state 302. In addition, only a master reset event 352 will result in a transition from dormant state 302. In alternate embodiments, other events may cause transitions to calibration state 304.

In calibration state 304, tag 102 initializes its timing circuitry. In an embodiment, in calibration state 304, tag 102 will not generate logical symbols "0," or "1" as they have not yet been defined. Instead, in calibration state 304, tag 102 performs a data calibration procedure and an optional oscillator calibration procedure. The optional oscillator calibration procedure involves tag 102 receiving multiple oscillator calibration pulses from reader 104, defined herein as edge transition (data) events. Specific timing is provided between edge transition events. Similarly, the data calibration procedure involves tag 102 receiving multiple data calibration pulses from reader 104. Data calibration results in the definition of data symbols used in communication between the reader and the tag.

As shown in FIG. 3, tag 102 may transition from calibration state 304 to dormant state 302 upon the occurrence of an event 354. In an embodiment, event 354 is defined by the reception of a signal that is not representative of timing signals expected by tag 102. For example, in an embodiment, oscillator calibration signals are defined as 8 pulses of equal length. If the oscillator calibration pulses received by tag 102 are significantly unequal or not within an expected range of lengths, the pulses may be considered invalid, causing occurrence of an event 354. Hence, when tag 102 receives signals that do not cause successful oscillator calibration or data calibration procedures, event 354 occurs.

After successful completion of the calibration procedures, tag 102 transitions to global command start state 306. During global command start state 306, if a data "1" is received from reader 104, tag 102 enters global command state 308. Receipt of a data "0" when in global command start state 306 directs tag 102 to evaluate its confirmed read flag 210. The confirmed read flag 210 indicates whether the tag has previously been read. If the confirmed read flag 210 has been set (i.e., indicating that the tag has already been read), tag 102 transitions to dormant state 302. If the confirmed read flag is not set, tag 102 transitions to tree traversal state 312. In an embodiment, receipt of a data "NULL" does not change the state of tag 102 in global command start state 306.

When operating in global command state 308, tag 102 receives a command from reader 104. Note that during global command start state 306 and global command state 308, one or more tags 102 may be active. Thus, reader 104 can place tags 102 in global command state in order to address a command to a group of tags 102 (e.g., a subset of all tags in field or all tags in the field). The command consists of multiple bits. In an embodiment, the command is 8 bits in length. As would be appreciated by persons of ordinary skill in the art, longer or shorter commands can be used with the present invention.

In an embodiment, tag 102 supports a set of mandatory global commands and one or more optional global commands. Example mandatory global commands include commands to reset the confirmed read flag 210, to set backscatter parameters, to immediately enter dormant state, and to immediately enter mute state.

In an embodiment, tag 102 supports an optional set marker command. This command sets the bit position which will be used as the first bit position during subsequent binary tree traversal. Tag 102 sets marker 230 at the bit position immediately following the bit position of the last bit of the identification number transmitted to reader 104 during a partial binary tree traversal. In an alternate embodiment, this command has a bit argument. Reader 104 provides the bit position for marker 230 in the argument. In an embodiment, the set marker command includes criteria or data specifying conditions for transitioning to a different state. For example, the set marker command may indicate that a tag should transition to dormant state if its counter value does not equal null counter match variable 250 and that the tag should transition to global command start state if its counter value equals null counter match variable 250.

Receipt of a data "NULL" while in global command state 308 indicates end of command receipt and causes tags to transition to global command start state 306 or dormant state 302. Upon receipt of the "NULL," tag 102 compares its null counter match variable 250 to the value of null counter 240. Tag 102 transitions from global command state 308 to dormant state 302 if the tag's counter value does not equal null counter match variable 250. In this way, reader 104 can remove a group of tags 102 from a subsequent binary tree traversal. Tag 102 may also transition to dormant state upon occurrence of event 356. For example, event 356 can be the detection of communications errors within a received command or receipt of a command for an unknown or disabled function. Tag 102 transitions from global command state 308 to global command start state 306 if the tag's counter value equals null counter match variable 250.

When operating in tree traversal state 312, tag 102 transmits all or a portion of its identification bit string (e.g., identification number) to reader 104 according to a binary tree traversal protocol that enables reader 104 to quickly interrogate a population of tags 120. An example of a binary tree traversal protocol is described below.

Upon entering tree traversal state 312, tag 102 transmits a first designated bit to reader 104. For example, if tag 102 has not received a set marker command (i.e., marker 230 is not set or is set at first bit position), the first designated bit is the bit in the first bit position of the identification bit string. If tag 102 has received a set marker command, the first designated bit is the bit in the bit position indicated by marker 230. While in tree traversal state, tag 102 receives a bit from the reader. Receipt of a data "0" or data "1" causes the tag to evaluate its last transmitted identification bit. If the last transmitted identification bit matches the bit received, tag 102 remains in tree traversal state 312. If the last transmitted identification bit does not match the bit received, tag 102 transitions to traversal mute state 314. Tags transition to traversal mute state 314 in this manner as a result of an unsuccessful negotiation. For ease of description, these tags are referred to as "unmatched tags."

Tag 102 transitions to traversal mute state 314 from tree traversal state 312 upon receipt of a data "NULL" prior to successful negotiation of all bits in the identification bit string or in the portion of the identification bit string being read. This transition results in a partial binary tree traversal. Tags transitioning to traversal mute state 314 in this manner have had one or more bits in their identification bit sequence successfully read. For ease of description, these tags are referred to as "matched tags." Tag 102 transitions to singulated command start state 316 from tree traversal state 312 upon receipt of a data "NULL" after successful negotiation of all bits in identification bit string or in the portion of the identification bit string being read.

In traversal mute state 314, tag 102 receives data from reader 104. However, when in traversal mute state 314, tag 102 provides no responses to reader 104. Thus, traversal mute state 314 disables tag 102 from responding to a particular request or command from reader 104. Note that during tree traversal, global command, and singulated command operations, one or more tags 102 may be active (e.g., in tree traversal state 312, in global command state 308, or in singulated command state 316) or temporarily inactive (e.g., in traversal mute state 314). Any other tags that have been completely or partially processed will be in dormant state 302. Reader 104 may collectively address the full population of tags 120 through implicit instructions. This means that upon receipt of a certain symbol, tag 102 determines its action based upon its current state. Thus, tag 102 does not have to receive a complete "explicit" instruction to perform functions, resulting in less data needing to be transferred between reader 104 and tag 102.

For example, reader 104 may send a data "NULL" to the population of tags. Those tags that are in traversal mute state 314 transition to tree start state 310 and clear their null counter 240. Tags 102 in tree traversal state 312 transition to either traversal mute state 314 or singulated command start state 316 depending on the number of bits successfully negotiated when the data "NULL" was received, as described above.

When in tree start state 310, receipt of a data "0" causes tag 102 to transition to tree traversal state 312. Receipt of a data "NULL" causes tag 102 to increment the value of null counter 240. Tag 102 remains in tree start state 310 when a data "NULL" is received. Receipt of a data "1" causes tag 102 to transition to global command state 308.

In general, a tag 102 is placed in singulated command start state 316 following successful negotiation of all of its identification bit string. When in singulated command start state 316, if a data "1" is received from reader 104, tag 102 enters singulated command state 318. Receipt of a data "0" causes tag 102 to set its confirmed read flag 210 and transition to dormant state 302. In an embodiment, receipt of a data "NULL" does not change the state of tag 102 in singulated command start state 314.

When operating in singulated command state 318, tag 102 receives a singulated command from reader 104. The singulated command consists of multiple bits. In an embodiment of the present invention, the command is 8 bits in length. Singulated command state 318 allows reader 104 to initiate features and functions on an individual tag, after the tag has been identified via a successful binary tree traversal. Tag 102 transitions from singulated command state to singulated command mute state 320 upon occurrence of event 358. In an embodiment, event 358 can be the detection of communications errors within a singulated command or a request for an unknown or disabled function. From singulated command mute state 320, tag 102 returns to singulated command start state 316 upon receipt of a data "NULL" from the reader.

Singulated command mute state 320 is similar in function to traversal mute state 314, described above. When operating in singulated command mute state 320, tag 102 receives data but does not respond to data transmitted by the reader.

1.3 Binary Tree Traversal Protocol

In accordance with an embodiment of the present invention, a binary tree traversal methodology is used in order to establish communication between a reader 104 and one of a population of tags 120 that are within the communication range of the reader. In an embodiment, contention between the tags 102 is avoided by requiring transmissions from each tag 102 to the reader 104 to be unique in a separation of frequency, but can be avoided in other ways. Contention may be defined as communications by multiple transmissions in the same frequency, time, and/or phase that thereby destructively interfere with each other's reception. Thus, in an example binary traversal algorithm, one bit of information is negotiated at a time between the reader 104 and the current population of tags 102 that the reader is addressing.

Each tag response bit is defined by two frequencies, one frequency for 0, and the other frequency for 1. In such a manner, many tags can simultaneously and non-destructively communicate a data 0 to a receiver. It is not important that the reader cannot differentiate a single data 0 from multiple data 0's, just that there exists a data 0. Alternatively, for example, a tag response may be defined by two time periods, one time period for "0", and the other for "1."

In an embodiment, the binary tree traversal process eliminates tags from communication until only one tag with a unique bit sequence is isolated and verified. As described above, each level in the binary tree represents a bit position in the tag identification bit sequence. As the reader proceeds through nodes (and levels) in the binary tree, it directs a subset of the population of tags to remain active and a subset of the population of tags to go inactive. For example, tags that last sent a matching bit remain active; those that did not will go inactive. Statistically, given a balanced tree, on each bit exchange, one half of the tag population will go inactive. This process continues until the reader reaches a node in the last level of the binary tree and results in a unique tag isolation and elimination. This process is repeated until each tag in the population of tags or each tag in a subset of the tag population is isolated.

Reader network 104 may employ the binary traversal protocol to interrogate a population of tags according to various techniques. A first example interrogation technique involves reading every tag 102 in a tag population 120 that can be detected. This technique is referred to as a general read interrogation. During a general read interrogation, reader network 104 traverses through the tag population by exchanging symbols with the tag population. During this process, when the reader network 104 receives two backscatter symbols simultaneously (such as a logical "0" and a logical "1") in response to a transmitted signal, it selects one of these symbols to transmit next. In doing so, reader network 104 evokes responses from any tags 102 that match the transmitted symbol, and implicitly places the remaining, non-responsive undesired tags 102 into traversal mute state. This may continue until no more responses are evoked from tags 102, until a predetermined number of bits have been traversed, or until reader network 104 has otherwise determined it has finished traversing tags 102.

Another interrogation technique verifies that a particular bit sequence (e.g., a bit sequence that identifies a specific tag) exists within its communications range. This technique is referred to herein as a specific read interrogation. During a specific read interrogation, reader network 104 traverses through the tag population using a particular bit sequence known in advance and used for verification.

For more information concerning binary tree traversal methodology, and, more generally, communication between an RFID reader and a population of RFID tags in accordance with an embodiment of the present invention, see U.S. Pat. No. 6,002,344, entitled "System and Method for Electronic Inventory" which is incorporated herein by reference in its entirety, and the following co-pending U.S. patent applications, each of which is incorporated by reference herein in its entirety: application Ser. No. 09/323,206, filed Jun. 1, 1999, entitled "System and Method for Electronic Inventory," application Ser. No. 10/072,885, filed Feb. 12, 2002, entitled "Method, System and Apparatus for Binary Traversal of a Tag Population," and application Ser. No. 10/073,000, filed Feb. 12, 2002, entitled "Method, System and Apparatus for Communicating with a RFID Tag Population,".

2. Reader Directed Partial Binary Tree Traversal

Figure 4:
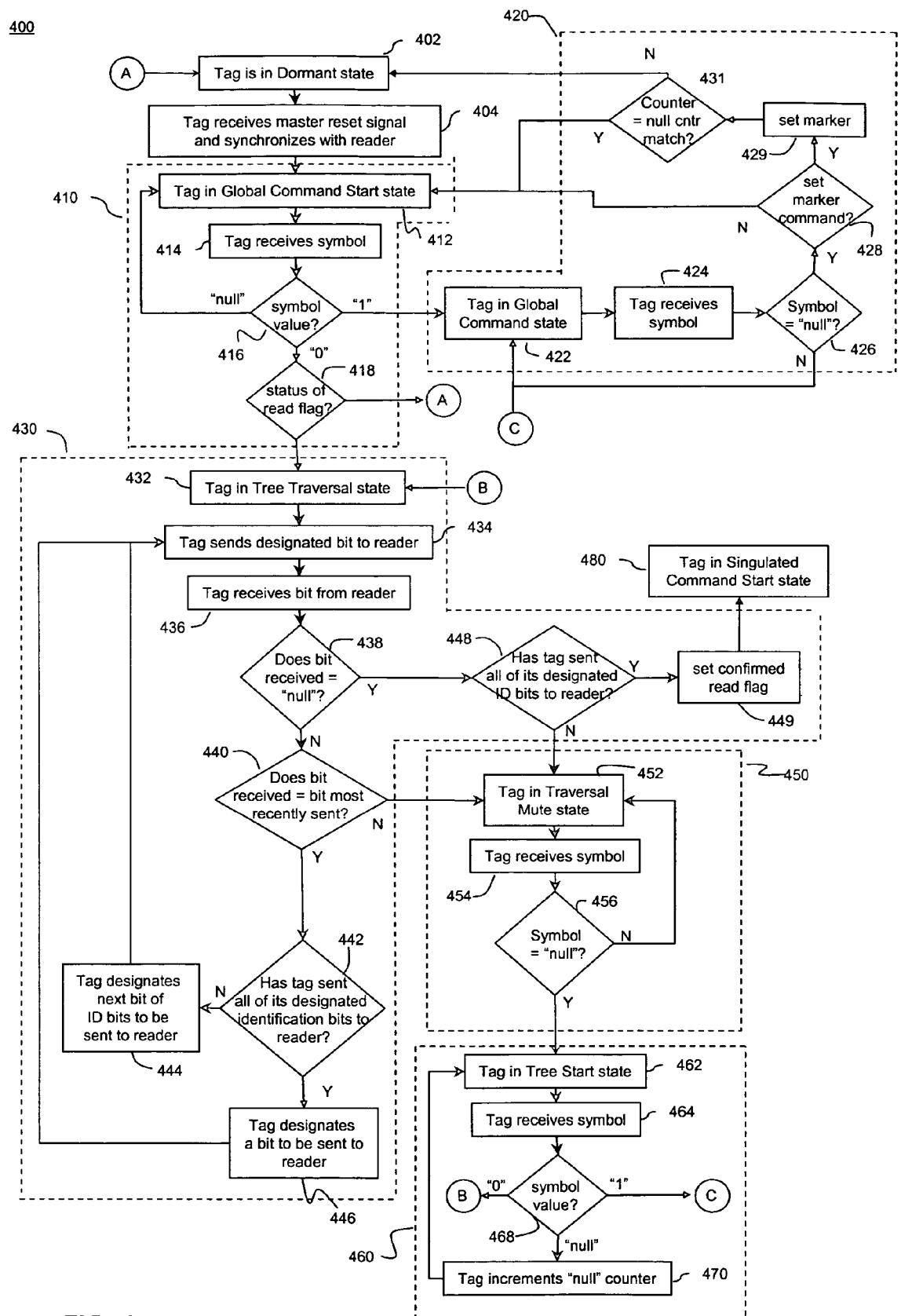
FIG. 4 is a flowchart illustrating an example operation of a reader directed partial binary tree traversal from the perspective of a single tag, according to an embodiment of the present invention.

FIG. 4 is a flowchart 400 illustrating an example operation of reader directed partial binary tree traversal from the perspective of a single tag 102, according to an embodiment of the present invention. By operating according to flowchart 400, reader 104 can reduce the number of bits needed to read individual tags. Thus, the time required to read each tag can be significantly reduced. Flowchart 400 will be described with continued reference to the exemplary embodiments shown in FIGS. 1, 2 and 3 above. However, the invention is not limited to those embodiments. Note that some steps shown in flowchart 400 do not necessarily have to occur in the order shown.

As shown in FIG. 4, flowchart 400 begins with step 402. In step 402, tag 102 is in dormant state 302.

In step 404, tag 102 receives a master reset signal from reader 104. Upon receipt of the master reset signal, tag 102 transitions from dormant state 302 to calibration state 304. Tag 102 is also synchronized with reader 104 in this step. For example, in step 404, tag 102 performs oscillator calibration and data calibration with reader 104. Upon completion of synchronization, tag 102 transitions from calibration state 304 to global command start state 306.

In step 410, tag 102 performs operations while in global command start state 306. Step 410 includes steps 412-418.

In step 412, tag 102 enters or remains in global command start state 306.

In step 414, tag 102 receives a symbol from the reader.

In step 416, tag 102 determines the value of the symbol received. If a "NULL" is received, operation returns to step 412 (i.e., tag 102 remains in global command start state 306). If a data "1" is received, operation proceeds to step 420 (i.e., tag 102 transitions to global command state 308). If a data "0" is received, operation proceeds to step 418.

In step 418, tag 102 determines the status of the confirmed read flag 210. If confirmed read flag is set, operation returns to step 402 (i.e., tag 102 enters dormant state 302). If confirmed read flag is not set, operation proceeds to step 430 (i.e., tag 102 transitions to tree traversal state).

In step 420, tag 102 performs operations while in global command state 308. Step 420 includes steps 422-429.

In step 422, tag 102 enters or remains in global command state 308.

In step 424, tag 102 receives a symbol from reader 104.

In step 426, tag 102 determines whether a "NULL" was received. If a "NULL" was received, operation proceeds to step 428. A "NULL" signals the end of a received command. If "NULL" was not received (i.e., data "0" or data "1" received), operation returns to step 422 (i.e., tag 102 remains in global command state 308). Receipt of a data "0" or data "1" indicates that tag 102 is still receiving command data from reader 104.

In step 428, tag 102 determines whether a set marker command was received. If a set marker command was not received, operation returns to step 410 (i.e., tag 102 enters global command start state 306). If a set marker command was received, operation proceeds to step 429. Note that tag 102 may receive any global command during step 420. Although not illustrated, as would be appreciated by persons of skill in the art, the necessary steps to respond to the received command would be taken by tag 102 in step 420.

In step 429, tag 102 sets marker 230 to the appropriate bit position. In an embodiment, marker 230 indicates the first bit position for subsequent binary tree traversal. In cases where the marker is not placed at the first bit position of the full identification bit sequence, any subsequent binary tree traversal is a traversal of subset of the binary tree (i.e., a partial binary tree traversal). Operation then proceeds to step 431.

In step 431, tag 102 determines whether the value of null counter 240 matches null counter match variable 250. In an embodiment, tag 102 uses a comparator having the null counter match variable and the null counter as inputs. The output of the comparator is an indication of whether a match occurred. If a match occurs, operation proceeds to step 412. Tags that enter global command state in this manner are considered "selected" for partial tree traversal. If no match occurs, operation returns to step 402. Tags that enter dormant state in this manner are considered "unselected" for partial tree traversal.

In step 430, tag 102 performs operations while in tree traversal state 312. Step 430 includes steps 432-449.

In step 432, tag 102 enters or remains in tree traversal state 312.

In step 434, tag sends its designated bit to reader. When tag 102 initially transitions to tree traversal state 312, the designated bit is the first bit of the identification bit sequence. In an embodiment, the first bit of the identification bit sequence is the most significant bit (MSB). In an alternate embodiment, the first bit of the identification bit sequence is the least significant bit (LSB). Alternatively, if a set marker command was received prior to entry of tree traversal state 312, the designated bit is the bit in the bit position identified by marker 230.

In step 436, tag 102 receives a symbol from reader 104.

In step 438, tag 102 determines whether the symbol received was a "NULL." If a "NULL" was received, operation proceeds to step 448. If a "NULL" was not received (e.g., data "0" or data "1" received), operation proceeds to step 440. Receipt of a data "0" or a data "1" causes tag 102 to proceed with binary tree traversal. Receipt of "NULL" causes tag 102 to transition to a different state.

In step 440, tag 102 determines whether the received symbol is equivalent to the bit most recently sent to reader 104. If the received symbol is equivalent to the most recently sent bit, operation proceeds to 442. This indicates a successful negotiation of the sent bit. If the received symbol is not equivalent to the most recently sent bit, operations proceeds to step 450 (i.e., tag 102 enters traversal mute state 314). This indicates an unsuccessful negotiation of the sent bit. Tag 102 is then considered an "unmatched" tag.

In step 442, the tag determines whether all bits of its identification bit sequence or all bits of the portion of its identification bit sequence being read have been sent to reader. If all bits have been sent, operation proceeds to step 446. If all bits have not been sent, operation proceeds to step 444.

In step 444, tag 102 designates the next bit of its identification bit sequence or next bit in the portion of its identification bit sequence being read for transmission to the reader. For example, if a marker was set at bit position A, the designated bit would be the bit in the position immediately next to bit position A. In this example, only a subset of bits (i.e., a portion) in the identification bit sequence is being read. Operation returns to step 434. Steps 434-444 are repeated until the entire identification bit sequence or portion of the bit sequence being read is successfully negotiated, until the tag unsuccessfully negotiates a bit and enters traversal mute state, or until the reader transmits a "NULL."

In step 446, tag 102 has transmitted all identification bits to reader 104. To complete negotiation, tag 102 designates a bit to be sent to reader 102. In an embodiment, the designated bit is the same bit sent to reader 104 (e.g., the last bit in the identification bit sequence). In an alternate embodiment, the designated bit is a random bit. Step 446 indicates the successful negotiation of all bits in the identification bit sequence or portion of the identification bit sequence. Operation then returns to step 434.

In step 448, tag 102 determines whether the "NULL" symbol was received after the tag has transmitted all bits in the identification bit sequence or portion of the identification bit sequence being read to reader 104. If all bits have been transmitted, operation proceeds to step 449. If all bits have not been transmitted, operation proceeds to step 450 (i.e., tag enters traversal mute state 314). Tags 102 entering traversal mute state 314 in this manner are considered "matched tags."

In step 449, the confirmed read flag 210 is set and operation proceeds to step 480 (i.e., tag 102 enters singulated command start state 316).

In step 450, tag 102 performs operations while in traversal mute state 314. Step 450 includes steps 452-456.

In step 452, tag 102 enters or remains in traversal mute state 314.

In step 454, tag 102 receives a symbol from reader 104.

In step 456, tag 102 determines whether a "NULL" was received. If "NULL" was received, operation proceeds to step 460. If "NULL" was not received, operation returns to step 452.

In step 460, tag 102 performs operations while in tree start state 310. Step 460 includes steps 462-472.

In step 462, tag 102 enters or remains in tree start state 310.

In step 464, tag 102 receives a symbol from reader 104.

In step 468, tag 102 determines the value of the received symbol. If a "NULL" was received, operation proceeds to step 470. If a data "1" was received, operation proceeds to step 422. Receipt of a data "1" causes tag 102 to transition to global command state. If a data "0" was received, tag 102 transitions to tree traversal state 312 and operation returns to step 432.

In step 470, tag 102 increments the value of null counter 240 and operation returns to step 462. In an alternate embodiment, tag 102 decrements its null counter.

In step 480, tag 102 performs operations while in singulated command start state. While in singulated command start state 316, tag 102 transitions to dormant state upon receipt of a data "0" or to singulated command state upon receipt of a data "1." If a data "0" is received, tag 102 sets its confirmed read flag to indicate tag 102 was read.

At this point, tag 102 has successfully negotiated its full tag identification sequence or a partial identification sequence.

The process of FIG. 4 provides a mechanism for reducing the number of bits required to successfully negotiate identification information from a group of tags in a tag population. By reducing the number of bits, the read time for each tag in the group can be reduced. Thus, a significant increase in the read rate for the tag population can be achieved through the process of FIG. 4.

Figure 5:
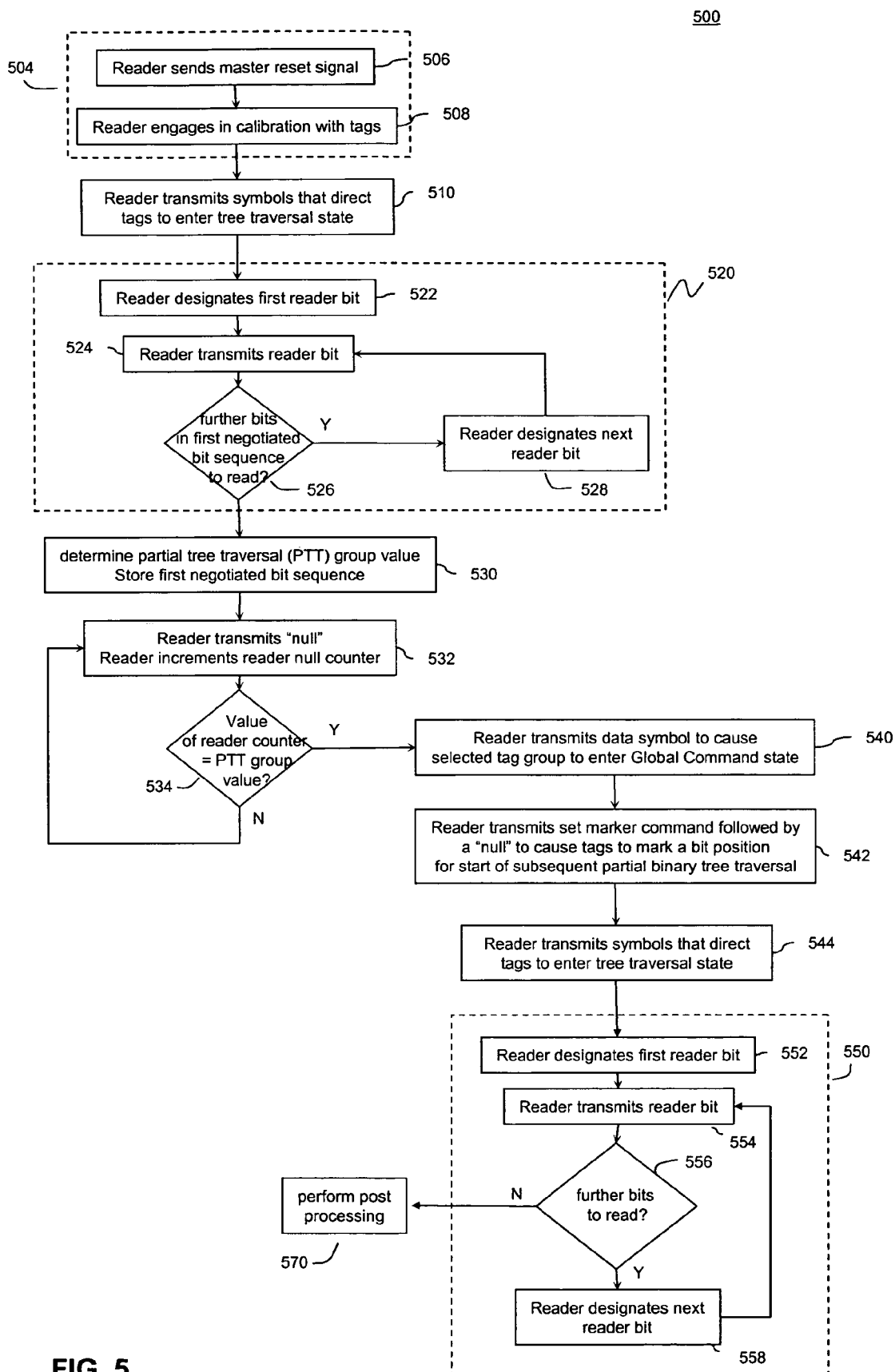
FIG. 5 is a flowchart illustrating an example operation of the reader directed partial binary tree traversal from the perspective of the reader, according to an embodiment of the present invention.

FIG. 5 is a flowchart 500 illustrating an example operation of the reader directed partial binary tree traversal from the perspective of reader 104, according to an embodiment of the present invention. Flowchart 500 will be described with continued reference to the exemplary embodiments shown in FIGS. 1, 2 and 3 above. However, the invention is not limited to those embodiments. Note that some steps shown in flowchart 500 do not necessarily have to occur in the order shown.

In step 504, the reader engages in start-up processing. Start-up signals are sent at the beginning of the interrogation of a population of tags 120. During the process, the reader emits signals to power the tags and to configure detailed timing points as required by the protocol. FIG. 5 depicts start-up processing as including two steps: 506 and 508.

In step 506, reader 104 sends a master reset signal. The master reset signal causes tags 102 within the communication range of reader 104 to transition to calibration state 304.

In step 508, reader 104 engages in calibration with tags 102. For example, reader 104 and tags 102 undergo oscillator and data calibration operations. Upon successful completion of calibration, tags 102 transition to global start state. As will be appreciated by persons skilled in the relevant arts, other methods for start-up processing 504 can be used without departing from the spirit or scope of the present invention.

In step 510, reader 104 sends one or more symbols causing active tags 102 to enter tree traversal state 312.

In step 520, reader 104 reads a first negotiated bit sequence according to a binary tree traversal protocol. In an embodiment, step 520 includes steps 522-528, described below. As would be appreciated by persons of skill in the art, other techniques for negotiating the first negotiated bit sequence could be used with the present invention.

In an embodiment, the number of bits in the first negotiated bit sequence equals the number of bits in a complete tag identification number. This is referred to herein as a "full identification sequence interrogation." In an alternate embodiment, the number of bits in the first negotiated bit sequence is less than the number of bits in a complete tag identification number. This is referred to herein as a "partial identification sequence interrogation." In this embodiment, the reader is performing one or more partial tree traversals on the tag population 120.

In an embodiment, the number of bits in the first negotiated bit sequence is predetermined. For example, the reader determines that binary tree traversal should be performed to negotiate a specific number of bits (e.g., 32 bits). In this embodiment, the reader may use a predefined sequence to direct the binary tree traversal. For example, a predefined sequence (e.g., 101000) could be used by the reader as the first negotiated bit sequence. In this embodiment, reader 104 issues signals during binary tree traversal that step tags through the predefined sequence regardless of the signals transmitted from tags to reader 104. Alternatively, the reader may perform a general read binary tree traversal, as described above. In this embodiment, binary tree traversal is performed until the reader receives both a "0" and a "1" from the tag population at a bit position. Thus, the values in the bit positions negotiated prior to the receipt of both a "0" and a "1" are identical for the tags in the tag population 120. The reader then only needs to negotiate the subsequent bit positions.

In step 522, reader 104 designates a first reader bit.

In step 524, reader 104 transmits the reader bit to tags 102.

In step 526, a determination is made whether any further bits in first negotiated bit sequence remain to be read. If bits remain to be read, operation proceeds to step 528. If no bits remain to be read, operation proceeds to step 530.

In step 528, reader 104 designates the next reader bit and operation returns to step 524.

In step 530, reader 104 determines the value of partial tree traversal group variable 260 if a complete tag identification is not negotiated in step 520. In this embodiment, the value of partial tree traversal group variable 260 indicates the number of "NULL" signals that reader 104 transmits to cause a "matched" tags to perform partial binary tree traversal. In an embodiment, reader 104 optionally stores the value of the bits in the first bit sequence.

In step 532, reader 104 transmits a "NULL" symbol to tags 102 and increments reader null counter 270. The first "NULL" symbol transmitted causes tags 102 in tree traversal state 312 ("matched tags") to transition to traversal mute state 314 and tags 102 in traversal mute state 314 ("unmatched tags") to transition to tree start state 310 and clear their tag null counter. The second "NULL" symbol transmitted causes tags 102 in traversal mute state 314 ("matched tags") to transition to tree start state 310 and clear their tag null counter and tags in tree start state 310 ("unmatched tags") to increment their tag null counter. After the second "NULL" both "matched" and "unmatched" tags are in tree start state. Any subsequent "NULL" symbol transmitted causes "matched tags" and "unmatched tags" to increment their tag null counter. Thus, "unmatched tags" will always have higher tag null counter value than "matched tags."

In step 534, reader 104 determines whether the value of the partial tree traversal group variable equals the value of reader null counter. If the value of partial tree traversal group variable equals reader null counter, operation proceeds to step 540. This indicates that reader 104 is ready to direct the tags to enter global command state. If the value of partial tree traversal group variable does not equal reader null counter, operation returns to step 532.

Steps 532 and 534 are repeated until the value of null counter match variable equals the value of reader null counter. As would be appreciated by a person of skill in the art, other methods could be used to determine when the reader should transmit a data symbol to cause selected tag groups to enter Global Command state. For example, the reader could set a counter or variable equal to the null counter match variable and decrement the counter/variable until zero is reached.

In step 540, reader 104 transmits one or more symbols which cause tags 102 to transition to global command state 308.

In step 542, reader 104 transmits a set marker command followed by a "NULL" symbol to cause tags 102 in global command state 308 (i.e., "selected tags") to mark a bit position for the start of a subsequent partial binary tree traversal and to direct those tags to transition to global command start state. In addition, this step causes tags to evaluate the value of their null counters. Tags 102 having the value of their null counter 240 equal to the tag null counter match variable 250 transition to global command state 308. These tags have been selected for subsequent partial tree traversal (i.e., "selected tags"). Tags 102 having the value of their null counter 240 not equal to the tag null counter match variable 250 transition to dormant state. These tags have not been selected for subsequent partial tree traversal (i.e., "unselected tags").

In step 544, reader 104 sends one or more symbols causing the selected tags 102 to enter tree traversal state 312.

In step 550, reader 104 reads the subsequent negotiated bit sequence according to a binary tree traversal protocol. In an embodiment, step 550 includes steps 552-558, described below. As would be appreciated by persons of skill in the art, other techniques for negotiating the subsequent negotiated bit sequence could be used with the present invention.

In an embodiment, the number of bits in the subsequent negotiated bit sequence equals the number of bits remaining to be read in a tag identification number. In an alternate embodiment, the number of bits in the subsequent negotiated bit sequence is less than the number of bits remaining to be read in a tag identification number.

In step 552, reader 104 designates a first reader bit.

In step 554, reader 104 transmits the reader bit to tags 102.

In step 556, a determination is made whether any further bits in the subsequent negotiated bit sequence remain to be read. If bits remain to be read, operation proceeds to step 558. If no bits remain to be read, operation proceeds to step 570.

In step 558, reader 104 designates the next reader bit and operation returns to step 554.

In step 570, reader 104 performs post processing. This step is optional. For example, if reader 104 is performing partial tree traversal on "matched tags," reader 104 may append the first negotiated bit sequence to the subsequent negotiated bit sequence.

3. Non-Sequential Bit String Masking

Based on the composition of the tag population, increased efficiency can be achieved through the use of a mask having a plurality of non-sequential sub-masks. Efficiency is gained as a result of the reduced number of bits sent back to the reader by each tag in the population. As RFID evolves, the natural tendency in composition of a tag's unique identifier is to compose sub-fields, or components, each with applicability to a section of a hierarchical scheme. While these hierarchical schemes read well, and coordinate well in software applications, they amount to very sparsely populated trees in even very large tag populations. For example, a 3-tiered numbering system comprised of manufacture, lot, and serial number having 64 bits is substantially larger than the minimum of 8 bits, for example, needed to uniquely identify a population of 250 tags addressed by a single reader. The inefficiencies grow more substantial as the number of bits in the hierarchical numbering system grows.

FIG. 6 depicts an exemplary 16-bit hierarchical numbering plan containing 3 subfields (bits 0-3, 4-9, and 10-15), a 16-bit tag population 620 present in a communication range of one reader, and an associated 16 bit mask 600 having non-sequential sub-masks as may be applicable to the tag population 620. The non-sequential sub-masks are sub-masks positioned across the mask in non-adjacent positions (i.e., there are one or more non-masked bits between each sub-mask). Mask 600 includes three sub-masks 604a-c. Sub-mask 604a masks bit positions 0 through 3. Sub-mask 604b masks bit positions 8 and 9. Sub-mask 604c masks bit position 12. Therefore, only 9 bits (in bit positions 4-7, 10, 11, and 13-15) must be collected from each tag in tag population 620 instead of the full 16 bits. As would be appreciated by a person of skill in the art, mask 600 can have any number of bits up to and including the same number of bits used to identify a tag. In addition, a person of skill in the art would also appreciate that any number of sub-masks having any size could be used with the present invention.

Mask 600 is described above as a bit mask. However, a person of skill in the art will recognize that a block mask (e.g., a mask covering a plurality of bits) could be used in the sub-masks of the present invention with similar efficiency and which does not depart from the spirit and scope of the present invention. For clarification, blocks consist of any number of bits, and may or may not be transmitted from tag to reader utilizing a single transmission symbol. Additionally, the exemplary embodiment depicts mask value 0 associating with a masked off (not transmitted) position. The choice of symbol and representation (for instance, a value 1 indicating masked off (not transmitted)) may be arbitrary and does not depart from the spirit and scope of this invention.

Figure 7:
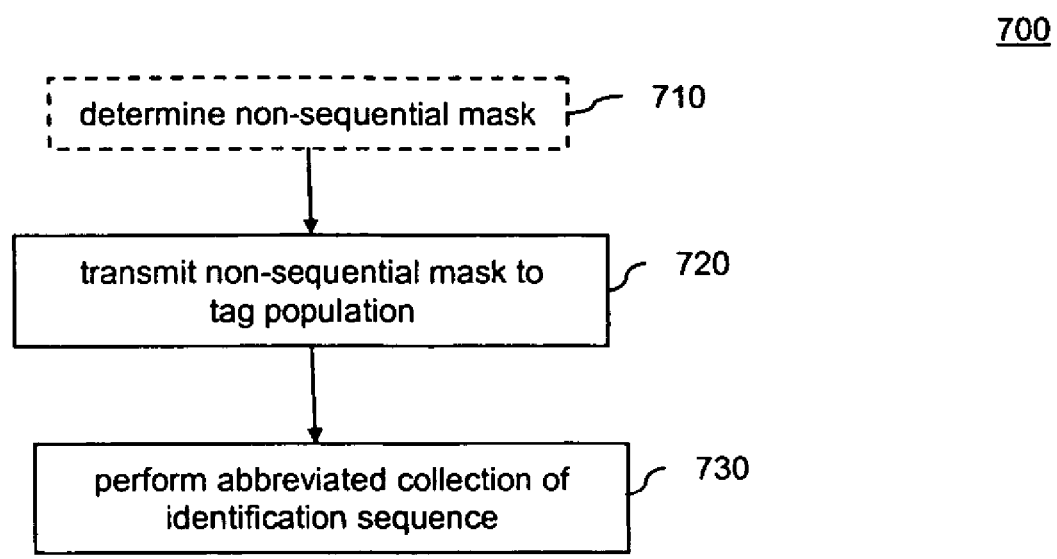
FIG. 7 is a flowchart of a method for performing non-sequential bit string masking from the perspective of a reader, according to an embodiment of the present invention.

FIG. 7 is a flowchart of a method 700 for performing non-sequential bit string masking from the perspective of a reader, according to an embodiment of the present invention.

Flowchart 700 will be described with continued reference to the exemplary embodiments shown in FIGS. 1, 2, 3, and 6 above. However, the invention is not limited to those embodiments.

Method 700 begins at step 710 when reader 710 determines the non-sequential bit string mask to use. For example, mask 600 of FIG. 6 could be used. Step 710 is optional. In an embodiment, when present, the non-sequential bit string mask is determined using superposition processing, as described below in Section 3.1. Alternatively, the non-sequential bit string mask could be determined prior to engaging in communication with tag population 120, as would be the case with controlled tag populations with known number ranges for one or more of the hierarchical components to the full information on the tag.

In step 720, the non-sequential bit string mask is transmitted to tag population 120. In an embodiment, reader 104 transmits a non-sequential mask command including the non-sequential mask, determined in step 710, to tag population 120. The mask command may also specify a memory bank indicator identifying the memory bank to which to apply the non-sequential mask. If no memory bank is specified, tag 102 applies the mask to the memory bank containing the tag identifier.

In an alternate embodiment, steps 710 and 720 are combined. This embodiment is described in further detail below in Section 3.2.

In step 730, the abbreviated collection of identification sequence bits is performed. As discussed above, reader 104 only needs to collect the unmasked bits from each tag 102 in tag population 120. In an embodiment, the collection of bits is performed using a binary tree traversal protocol, as described below in Section 3.3.

In an alternate embodiment, the collection of bits is performed using a different interrogation protocol, such as a slot-based protocol. For example, a tag may receive one or more commands that cause it to enter a reply state and subsequently transmit its abbreviated identification information during a specific slot. In an embodiment, the slot is determined by a pseudo-random number or random number generated by the tag. For more information on the sequence of commands used to cause a tag to transmit its identification information in a slot-based protocol, see "EPC Radio-Frequency Identity Protocols Class-1 Generation-2 UHF RFID Protocol for Communication at 860 MHz-960 MHz" and "13.56 MHz ISM Band Class 1 Radio Frequency Identification Tag Interface Specification," each of which is incorporated herein by reference in its entirety. As would be appreciated by persons of skill in the art, other identification protocols could be used with the present invention.

During the collection step, in an embodiment, tag 102 sends only the unmasked bits of its identification information to reader 104. Thus, only a sub-set of the total number of bits identifying the tag is transmitted to the reader. If mask 600 shown in FIG. 6 was received by tags 102a,b, and c, each tag in tag population 620 subsequently transmits only the 9 bits, as shown in the abbreviated traversal sequences 630a, 630b, and 630c. Collection of only 27 bits of an otherwise 48 bit process substantially increases the efficiency of the entire collection process.

3.1 Determining Mask Using Superposition

Superposition allows acquisition of information about the entire population of tags 120 that is within communications range of reader 104. In superposition processing, a tag always processes its next bit until each bit in the identification sequence has been transmitted, regardless of the value of the bit received from the reader. This is in contrast to binary tree traversal processing where a tag may be placed in a mute state by the reader prior to transmitting its entire identification sequence.

By using superposition processing, reader 104 can determine bit positions having the same values for all tags in a tag population 120. For example, all tags being interrogated may have identification numbers associated with the same manufacturer. Thus, during superposition processing, reader 104 can determine that the first 32 bits of the tag identification sequences of all tags are identical. In addition, the 64 bits remaining bits may include only 10 bit positions that have different values for the entire tag population. Therefore, reader 104 only needs to read 10 bits out of an otherwise 96 bit process to uniquely identify each tag in tag population 120.

Figure 13:
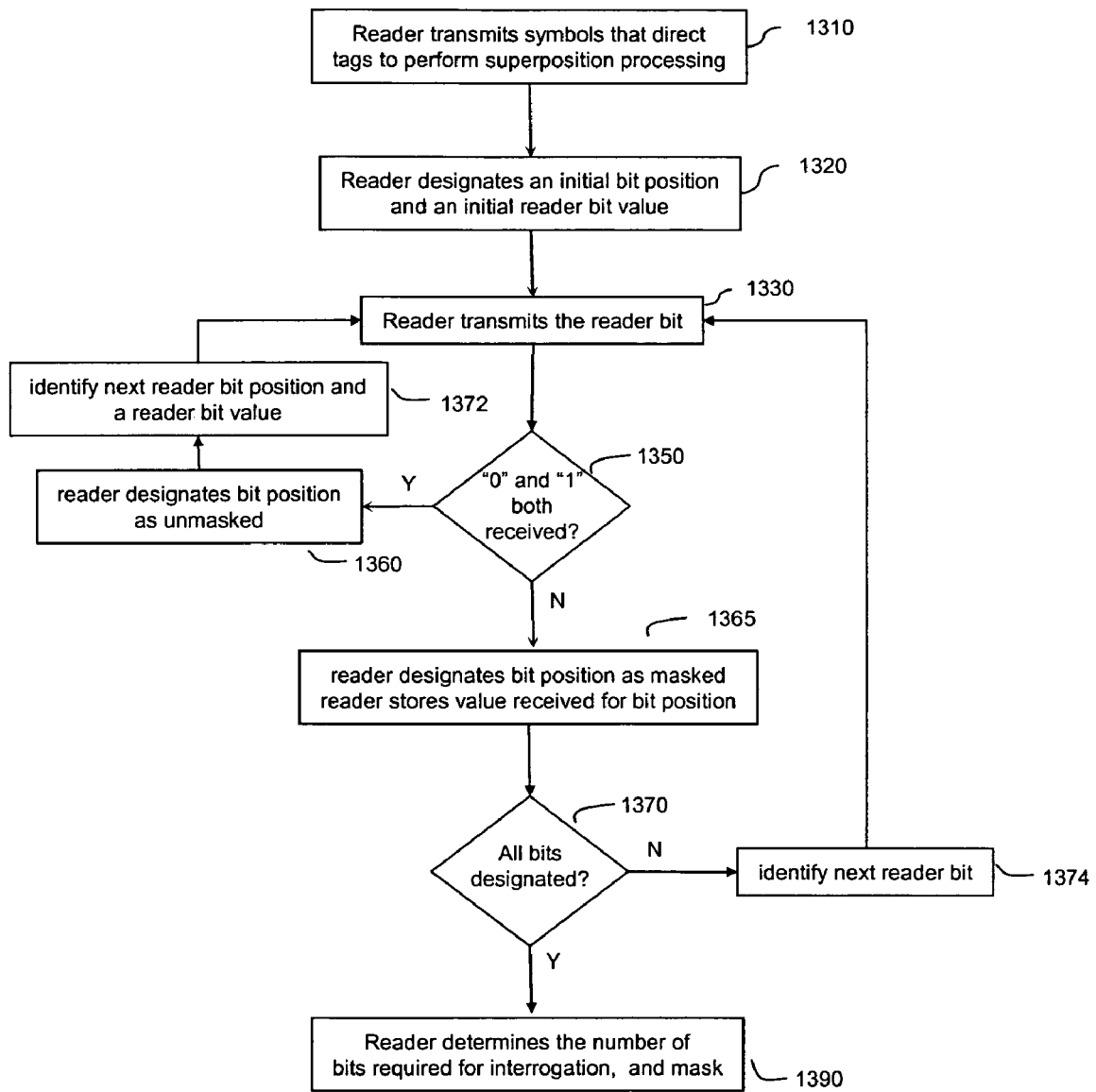
FIG. 13 is a flowchart of a method for performing superposition processing from the perspective of reader, according to an embodiment of the present invention.

FIG. 13 is a flowchart of a method 1300 for performing superposition processing from the perspective of reader 104, according to an embodiment of the present invention. In this embodiment, reader 104 has the ability (and opts) to receive data "1" and data "0" signals simultaneously. Flowchart 1300 will be described with continued reference to the exemplary embodiments shown in FIGS. 1, 2 and 3 above. However, the invention is not limited to those embodiments. Note that some steps shown in flowchart 1300 do not necessarily have to occur in the order shown.

In step 1310, reader 104 transmits symbols that cause tags 102 in tag population 120 to perform superposition processing. In a binary tree traversal embodiment, reader 104 transmits symbols causing tags 102 to enter a global command state. Reader 104 then transmits a superposition processing command. In an alternate protocol embodiment, reader 104 transmits a superposition processing command or unique symbol. For example, this command may be a custom or proprietary command.

In step 1320, reader 104 designates an initial bit position and an initial value for the bit at the initial bit position.

In step 1330, reader 104 transmits the reader bit.

In step 1350, reader 104 determines whether both a data "0" and a data "1" were received for the bit position. If both were received operation proceeds to step 1360. If only a single value was received, operation proceeds to step 1365.

In step 1360, reader 104 designates the bit position as unmasked. This indicates that a value at this bit position will be collected from tags in tag population 120. In an embodiment, reader 104 creates a mask having a "1" in this bit position. Operation then proceeds to step 1370.

In step 1365, reader 104 designates the bit position as masked. Because a single value was received from all tags in tag population 120, reader 104 does not need to collect a value at this bit position from tags in tag population 120. In addition, in step 1365, reader 104 stores the received value for the present bit position. Operation then proceeds to step 1370.

In step 1370, reader 104 determines whether all bit positions have been designated. If all bit positions have been designated, operation proceeds to step 1375. If all bit positions have not been designated, operation proceeds to step 1390.

In step 1375, reader 104 identifies the next reader bit position and a value for the reader bit to be transmitted to tag population 120. In an embodiment, the value for a reader bit to be transmitted would indicate the bit mask at that bit position just received from the tag population. Operation then returns to step 1330.

In step 1390, reader 104 determines one or more of the following: the number of bits required for interrogation (e.g., the number of unmasked bits), and the non-sequential mask to be transmitted to tag population 120.

Figure 12:
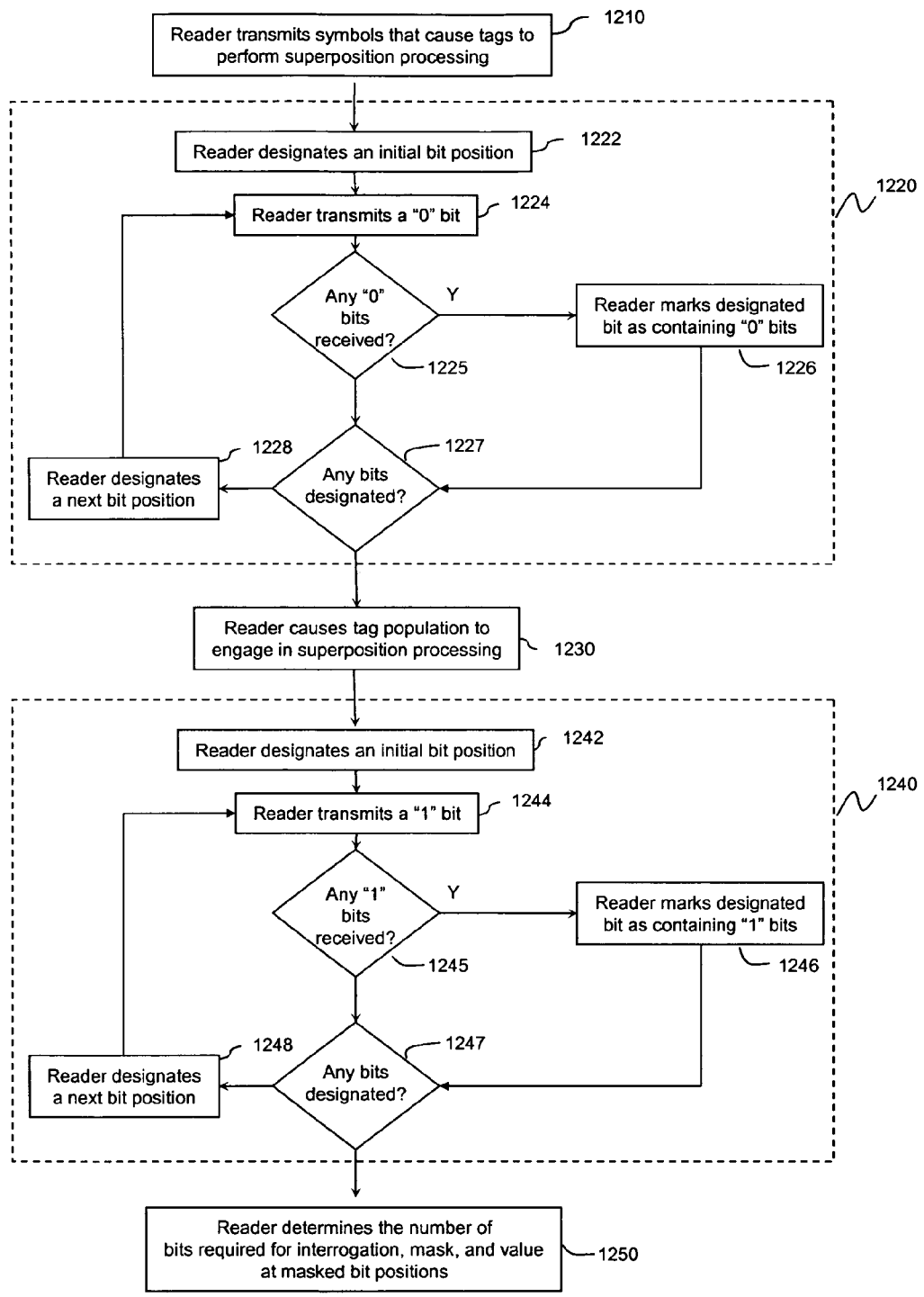
FIG. 12 is a flowchart of a method for performing superposition processing from the perspective of a reader, according to an embodiment of the present invention.

FIG. 12 is a flowchart of a method 1200 for performing superposition processing from the perspective of a reader, according to an embodiment of the present invention. In this embodiment, reader 104 does not have the ability (or opts not to) to receive a data "0" and a data "1" simultaneously. Flowchart 1200 will be described with continued reference to the exemplary embodiments shown in FIGS. 1, 2 and 3 above. However, the invention is not limited to those embodiments. Note that some steps shown in flowchart 1200 do not necessarily have to occur in the order shown.

In step 1210, reader 104 transmits symbols that cause tags 102 in tag population 120 to perform superposition processing. In an embodiment, reader 104 transmits symbols causing tags 102 to enter global command state. Reader 104 then transmits a superposition processing command. In an alternate embodiment, reader 104 transmits a superposition processing command or unique symbol.

In step 1220, reader 104 determines the positions of "0" bits in tag population's 120 identification sequences. Step 1220 includes steps 1222-1228.

In step 1222, reader 104 designates an initial bit position.

In step 1224, reader 104 transmits a data "0".

In step 1225, reader 104 determines whether a data "0" responses were received from tag population 120. If no data "0" backscatter symbols were received, operation proceeds to step 1227. If one or more data "0" backscatter symbols were received, operation proceeds to step 1226.

In step 1226, reader 104 marks the designated bit position as containing one or more data "0" bits. Operation then proceeds to step 1227.

In step 1227, reader 104 determines whether it has designated all identification sequence bit positions. If all identification sequence bit positions have been designated, operation proceeds to step 1230. If all identification sequence bit positions have not been designated, operation proceeds to step 1228.

In step 1228, reader 104 designates a next identification bit sequence bit position. Operation returns to step 1224.

In step 1230, reader 104 causes the tag population 120 to again engage in superposition processing. In an embodiment, reader 104 transmits a "NULL" symbol to cause the tags 102 to transition to global command start state 306 and then transmits a data "1" to direct tags 102 within its communication range to transition to global command state 308. Reader 104 transmits a superposition command or unique symbol to cause the tag population to engage again in superposition processing. In an alternate embodiment, receipt of a superposition command causes tags 102 to automatically engage in two rounds of superposition processing. Alternatively, in embodiments where tags 102 perform circular register rotation techniques to designate and transmit identification sequence bits, each tag 102 may be designating its initial identification bit upon completion of step 1220.

In step 1240, reader 104 determines the positions of "1" bits in the tag population's 120 identification sequences, in a manner very similar to that described above for step 1220. Step 1240 includes steps 1242-1248.

In step 1242, reader 104 designates an initial bit position.

In step 1244, reader 104 transmits a data "1" symbol.

In step 1245, a determination is made whether any data "1" symbols in response to the data "1" symbol transmitted in step 1244. If no data "1" symbols were received, operation proceeds to step 1247. If one or more data "1" backscatter symbols were received, operation proceeds to step 1246.

In step 1246, reader 104 marks the designated bit position as containing one or more data "1" bits. Operation proceeds to step 1247.

In step 1247, reader 104 determines whether it has designated all identification sequence bit positions. If all identification sequence bit positions have been designated, operation proceeds to step 1250. If all identification sequence bit positions have not been designated, operation proceeds to step 1248.

In step 1248, reader 104 designates a next identification sequence bit position. Operation returns to step 1244.

In step 1250, reader 104 determines one or more of the following: the number of identification sequence bit positions required for interrogation, the non-sequential mask, and/or the value of a mask bit at each bit position. For example, for each bit position, reader 104 determines whether a data "1" and a data "0" were received during superposition processing. If both were received, reader 104 designates the bit position as unmasked. If only a single data value was received for a bit position, reader 104 designates the bit position as masked and stores the value received at the bit position.

In the example embodiment of FIG. 6, reader 104 interrogates a tag population 620 having three tags 102a, 102b, and 102c. Each tag 102a, 102b, and 102c has a 16-bit identification number 602a-c. During superposition processing, reader 104 determines that each tag has the same bit value at bit positions 0-3, 8, 9, and 12. As a result, reader 104 creates mask 600, having non-sequential masks 604a, 604b, and 604c. Sub-mask 604a masks bit positions 0-3. Sub-mask 604b masks bit positions 8 and 9 and sub-mask 604c masks bit position 12.

Reader 104 then only collects bit values for bit positions 4-7, 10, 11, and 13-15 during abbreviated collection processing. For example, for tag 102a, reader 104 collects bit sequence 630a. For tag 102b, reader 104 collects bit sequence 630b. For tag 102c, reader 104 collects bit sequence 630c.

3.2 Determining and Setting Mask Using Superposition

Figure 14:
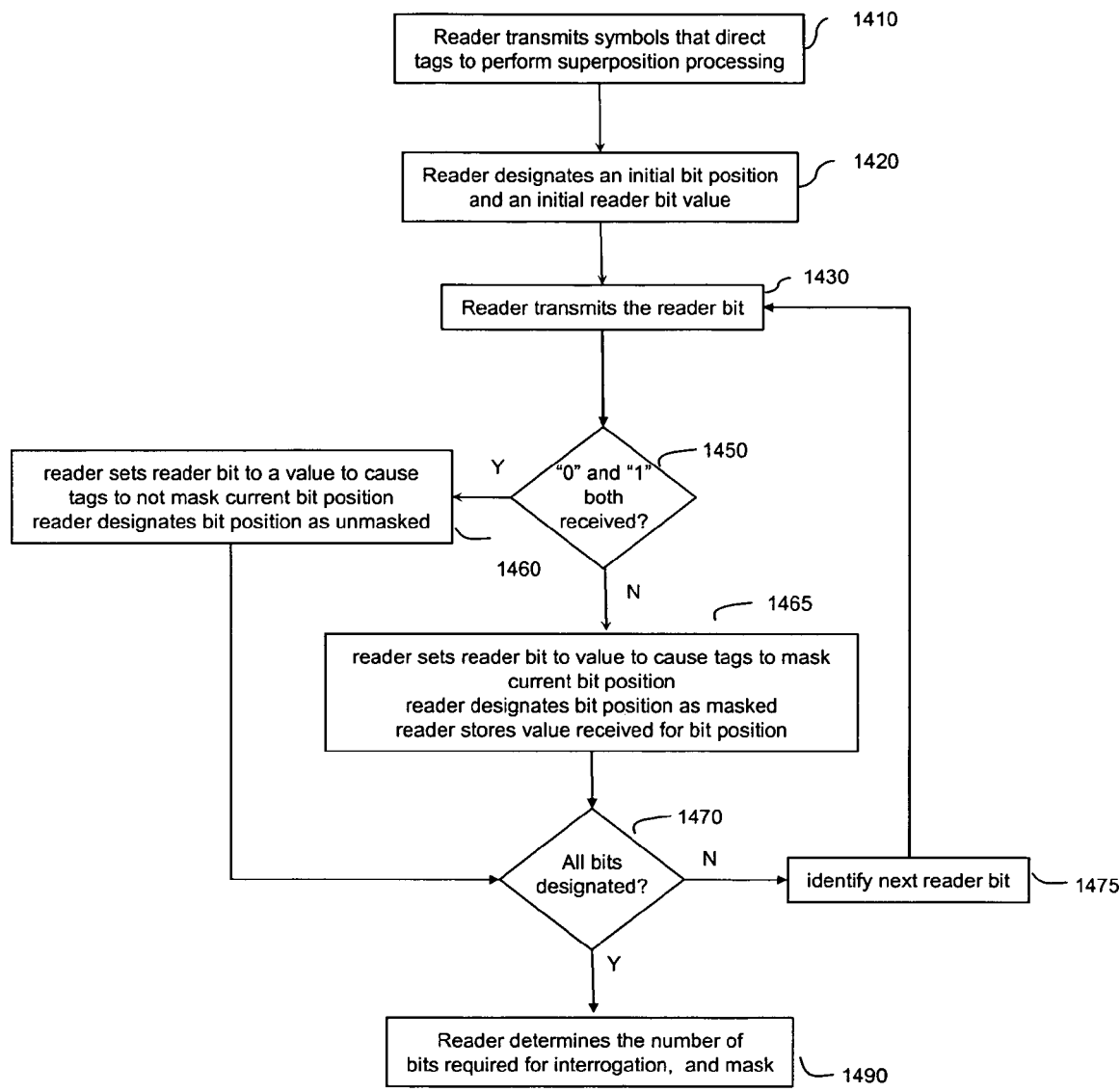
FIG. 14 is a flowchart of a method for determining and setting a mask during superposition processing from the perspective of reader, according to an embodiment of the present invention.

FIG. 14 is a flowchart of a method 1400 for determining and setting a mask during superposition processing from the perspective of reader 104, according to an embodiment of the present invention. In this embodiment, reader 104 has the ability to receive data "1" and data "0" signals simultaneously. Flowchart 1400 will be described with continued reference to the exemplary embodiments shown in FIGS. 1, 2 and 3 above. However, the invention is not limited to those embodiments. Note that some steps shown in flowchart 1400 do not necessarily have to occur in the order shown.

In step 1410, reader 104 transmits symbols that cause tags 102 in tag population 120 to perform superposition processing.

In step 1420, reader 104 designates an initial bit position and an initial value for the bit at the initial bit position.

In step 1430, reader 104 transmits the reader bit.

In step 1450, reader 104 determines whether both a data "0" and a data "1" were received for the bit position. If both were received operation proceeds to step 1460. If only a single value was received, operation proceeds to step 1465.

In step 1460, reader 104 designates the bit position as unmasked. Reader 104 then sets the reader bit to a value to cause tags to not mask the bit position corresponding to the bit just transmitted. For example, reader bit is set to a data "0." Operation then proceeds to step 1470.

In step 1465, reader 104 designates the bit position as masked. Reader 104 then sets the reader bit to a value to cause tags to mask the bit position corresponding to the bit just transmitted. For example, reader bit is set to a data "1." In addition, reader 104 stores the received value for the present bit position. Operation then proceeds to step 1470.

In step 1470, reader 104 determines whether all bit positions have been designated. If all bit positions have been designated, operation proceeds to step 1490. If all bit positions have not been designated, operation proceeds to step 1475.

In step 1475, reader 104 identifies the next reader bit position. Operation then returns to step 1430 where the reader bit value determined in step 1460 or 1465 is transmitted to tag population 120.

Steps 1430-1475 are repeated for each bit position. In this manner, the mask is transmitted to tags on a bit by bit basis using the reader bit during superposition processing.

In step 1490, reader 104 determines one or more of the following: the number of bits required for interrogation (e.g., the number of unmasked bits), and the non-sequential mask exchanged with the tag. In addition, a superposition bit string having values at each masked bit position is generated.

Figure 15:
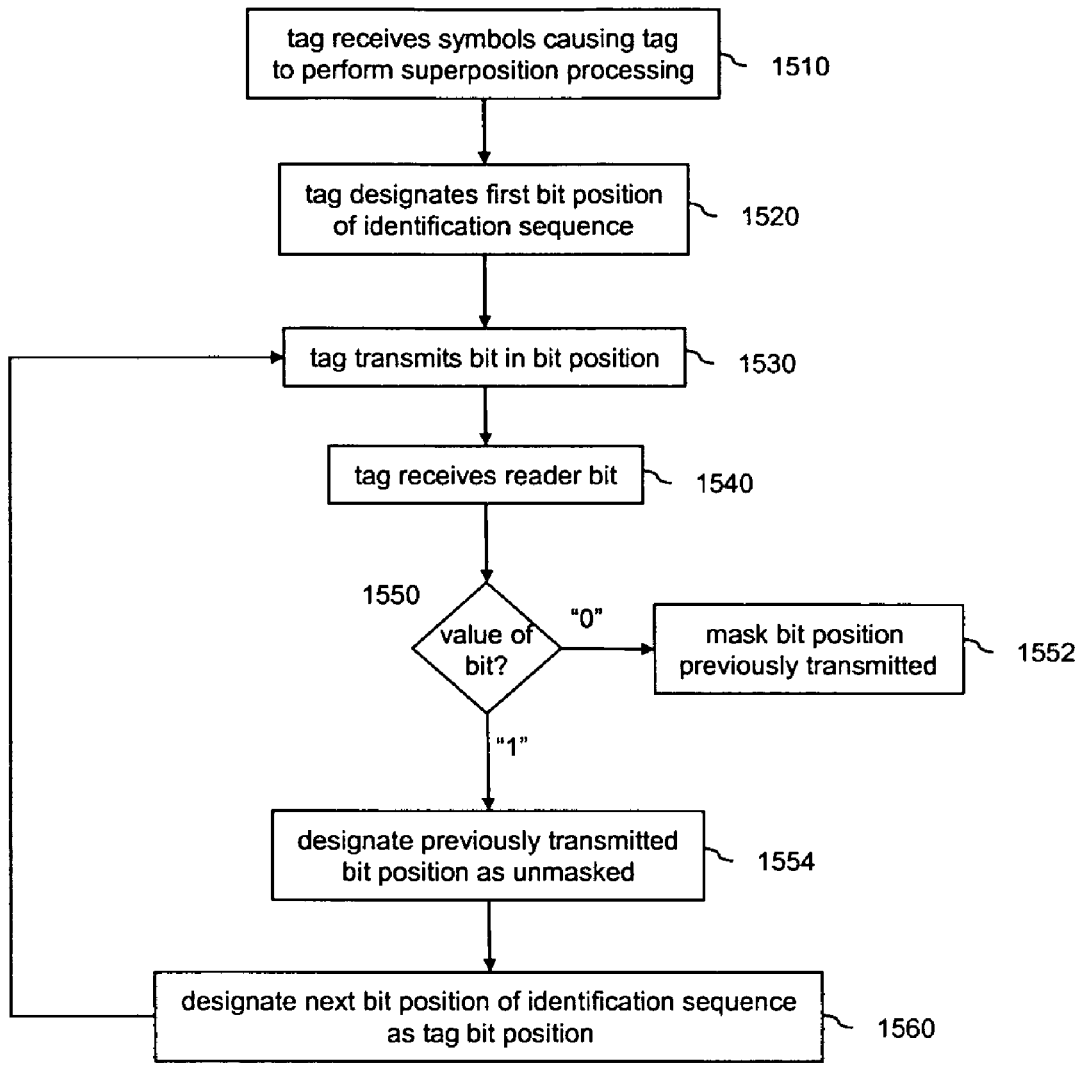
FIG. 15 is a flowchart of a method for determining and setting a mask during superposition processing from the perspective of tag, according to an embodiment of the present invention.

FIG. 15 is a flowchart of a method 1500 for determining and setting a mask during superposition processing from the perspective of tag 102, according to an embodiment of the present invention. Flowchart 1500 will be described with continued reference to the exemplary embodiments shown in FIGS. 1, 2 and 3 above. However, the invention is not limited to those embodiments. Note that some steps shown in flowchart 1500 do not necessarily have to occur in the order shown.

Flowchart 1500 begins at step 1510 when tag 102 receives symbols that cause tag 102 to perform superposition processing.

In step 1520, tag 102 designates the first bit position of tag identification sequence as the tag bit position.

In step 1530, tag 102 transmits the bit in the tag bit position.

In step 1540, tag 102 receives a reader bit. The reader bit indicates the designation to be given to the current bit position of the identification sequence. The designation determines whether the bit in the bit position will be collected during a subsequent abbreviated identification sequence negotiation.

In step 1550, tag 102 determines the value of the bit received. If a bit indicating "mask" was received (e.g., a data "0"), operation proceeds to step 1552. If a bit indicating "unmask" was received (e.g., a data "1"), operation proceeds to step 1554.

In step 1552, tag 102 masks the bit position of the identification sequence. This bit will not be transmitted by tag 102 in a subsequent negotiation. In an embodiment, tag 102 places a "0" in a tag mask for the bit position. Operation proceeds to step 1560.

In step 1554, tag 102 does not mask the bit position of the identification sequence. As a result, this bit will be transmitted by tag 102 in a subsequent negotiation. In an embodiment, tag 102 places a "1" in a tag mask for the bit position. Operation proceeds to step 1560.

In step 1560, tag 102 designates the next bit position as the tag bit position. Operation then returns to step 1530.

3.3 Binary Tree Traversal Protocol

Figure 8:
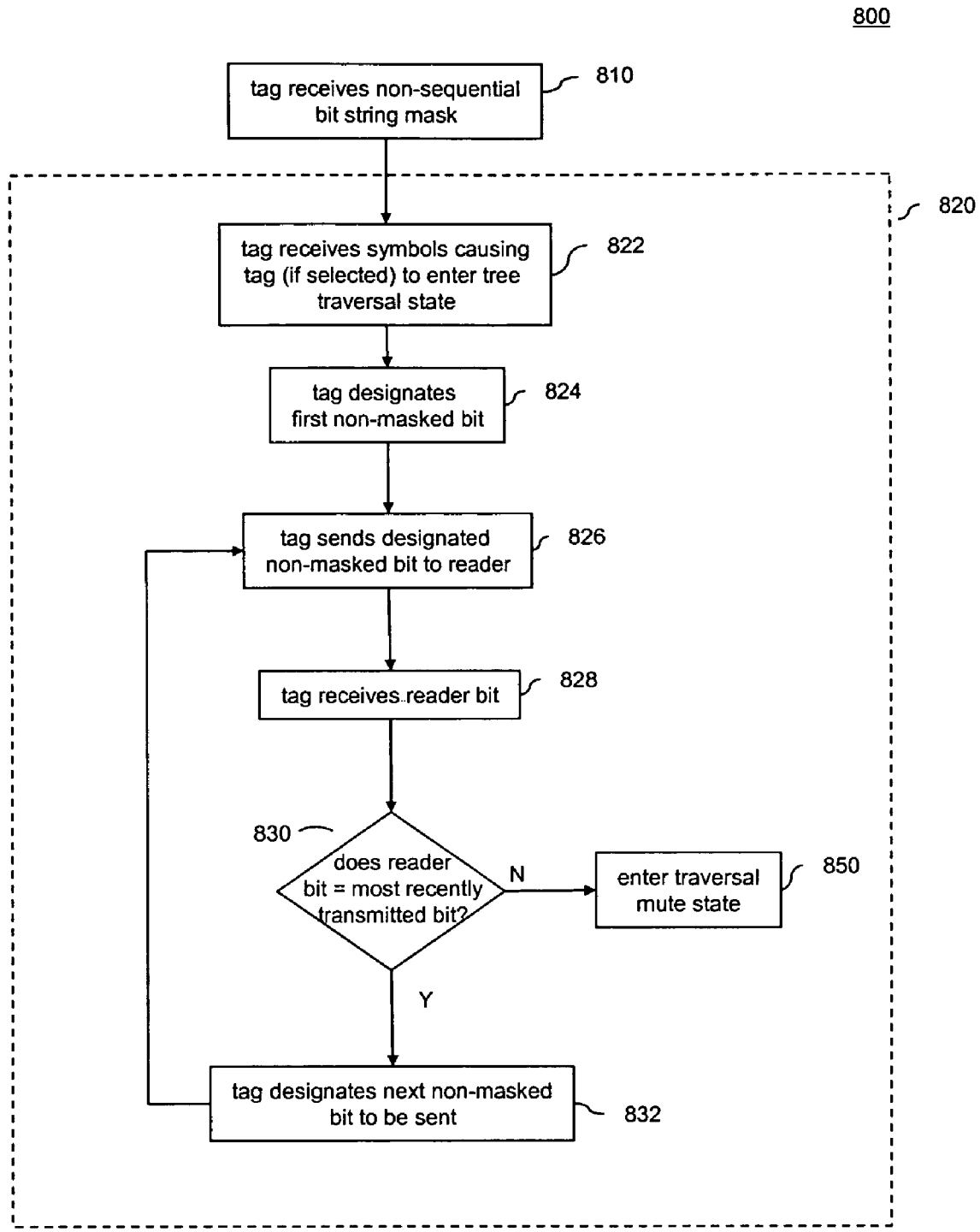
FIG. 8 is a flowchart of a method for performing non-sequential bit string masking using binary tree traversal from the perspective of an individual tag, according to an embodiment of the present invention.

FIG. 8 is a flowchart of a method 800 for performing non-sequential bit string masking in a binary tree traversal interrogation protocol from the perspective of an individual tag, according to an embodiment of the present invention. Flowchart 800 will be described with continued reference to the exemplary embodiments shown in FIGS. 1, 2, 3, and 6 above. However, the invention is not limited to those embodiments. Note that some steps shown in flowchart 800 do not necessarily have to occur in the order shown.

Method 800 begins at step 810, when tag 102 receives a non-sequential mask.

In an embodiment, during step 810, tag 102 is placed in a global command state. Tag 102 then receives a non-sequential mask command followed by a mask having a plurality of non-sequential sub-masks. In an embodiment, the mask is the same length as the length of the bit string identifying the tag. For example, the mask can be mask 600 shown in FIG. 6.

In an alternate embodiment, during step 810, tag 102 receives the non-sequential mask during superposition processing, as described above in Section 3.2.

In step 820, an abbreviated collection of the non-masked bits is performed using binary tree traversal. Step 820 includes steps 822 through 832.

In step 822, tag 102 receives symbols causing tag 102 to enter tree traversal state. During the subsequent tree traversal, tag 102 only negotiates the unmasked bits in the received mask. Thus, only a sub-set of the total number of bits identifying the tag is exchanged with the reader. For example, if mask 600 shown in FIG. 6 was received by tag 102, tag 102 would subsequently negotiate only 9 bits, as opposed to the full 16 bits of the identification sequence.

In step 824, tag 102 designates a first non-masked bit for transmission to the reader. For example, in mask 600, the first non-masked bit is the bit in bit position 4.

In step 826, tag 102 transmits the non-masked bit to reader 104.

In step 828, tag 102 receives a bit from reader 104.

In step 830, tag 102 determines whether the received reader bit equals the bit most recently transmitted to the reader. If the reader bit matches the transmitted bit, operation proceeds to step 832. If the reader bit does not match the most recent transmitted bit, operation proceeds to step 850.

In step 832, tag 102 designates the next non-masked bit for transmission to the reader. Operation then returns to step 810.

In step 850, tag 102 enters mute state.

Steps 822 through 832 are repeated until all non-masked bits have been exchanged with the reader.

Figure 9:
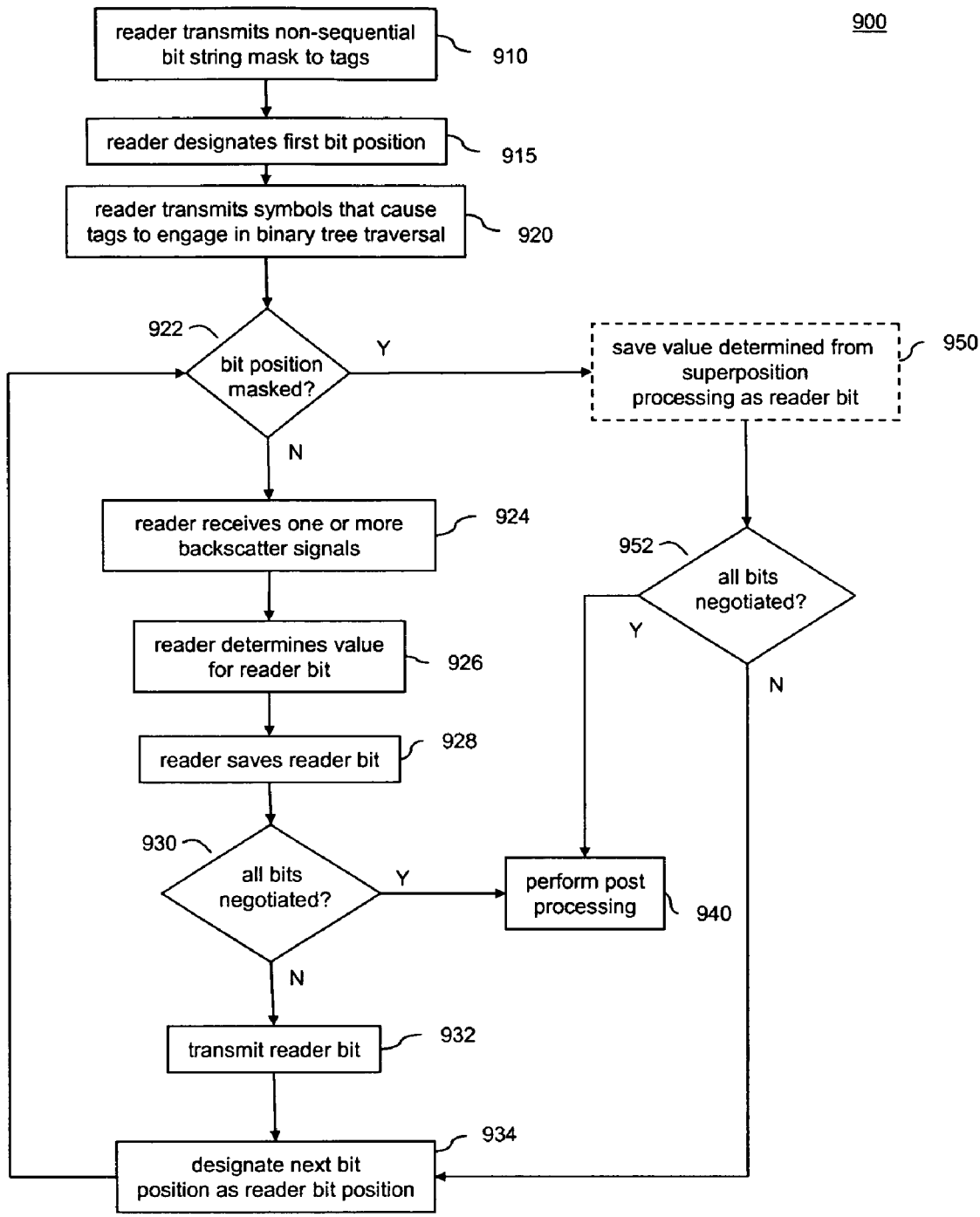
FIG. 9 is a flowchart of a method for performing non-sequential bit string masking using binary tree traversal from the perspective of a reader, according to an embodiment of the present invention.

FIG. 9 is a flowchart of a method 900 for performing non-sequential bit string masking from the perspective of a reader, according to an embodiment of the present invention. Flowchart 900 will be described with continued reference to the exemplary embodiments shown in FIGS. 1, 2, 3, and 6 above. However, the invention is not limited to those embodiments. Note that some steps shown in flowchart 900 do not necessarily have to occur in the order shown.

Method 900 begins at step 910 when reader 104 transmits a non-sequential bit string mask to tag population 120.

In an embodiment, during step 910, reader 104 determines the mask to be transmitted using superposition processing, as described above in Section 3.1. Reader 104 then transmits symbols that direct tags to enter global command state. Reader 104 then transmits a non-sequential mask command including the non-sequential mask.

In an alternate embodiment, during step 910, reader 104 determines and transmits the non-sequential bit string mask during superposition processing, as described above in Section 3.2.

During the subsequent tree traversal, reader 104 only collects the unmasked bits in the mask from tags in tag population 120. Thus, only a sub-set of the total number of bits identifying the tag is collected during the standard tree traversal.

In step 915, reader 104 designates the first bit position as the reader bit position.

In step 920, reader 104 transmits one or more symbols that cause tags to enter a state for engaging in binary tree traversal.

In step 922, a determination is made whether the reader bit position is a masked bit position. If the reader bit position is masked, operation proceeds to step 950. If the reader bit position is unmasked, operation proceeds to step 924.

In step 924, reader 104 receives one or more backscatter symbol responses from the population of tags 120.

In step 926, reader 104 determines the value for the reader bit associated with the first non-masked bit position. After receiving the responses from the tags 102, reader 104 determines which binary traversal path (i.e., the value of the bit at the bit position being negotiated) will be taken. To make this determination, reader network 104 has a preference for a particular signal. For example, reader 104 may have a preference for the strongest received signal.

In step 928, reader 104 stores the determined value for the bit.

In step 930, a determination is made whether all bits have been negotiated. If all non-masked bits have been negotiated, operation proceeds to step 940. If non-masked bits remain to be negotiated, operation proceeds to step 932.

In step 932, reader 104 transmits the determined reader bit to tag population 120.

In step 922, reader 104 designates the next bit position as the reader bit position. Operation then returns to step 922.

In step 940, reader 104 performs post processing. Step 940 is optional. When present, reader 104 may combine the negotiated non-masked bits with mask and the values collected during superposition processing to generate a complete tag identification bit string. Alternatively, reader 104 may transmit the abbreviated bit sequence to a separate processor for post processing. If post processing is performed, step 950 is not present.

In step 950, the value determined from superposition processing is saved. Step 950 is optional. When present, reader 104 accumulates the entire identification sequence during method 900. Operation then proceeds to step 952. If step 950 is present, post processing in step 940 is not required.

In step 952, a determination is made whether all bits have been negotiated. If all non-masked bits have been negotiated, operation proceeds to step 940. If non-masked bits remain to be negotiated, operation proceeds to step 934.

3.4 Set Marker Command Plus Global Mask Command

Figure 10:
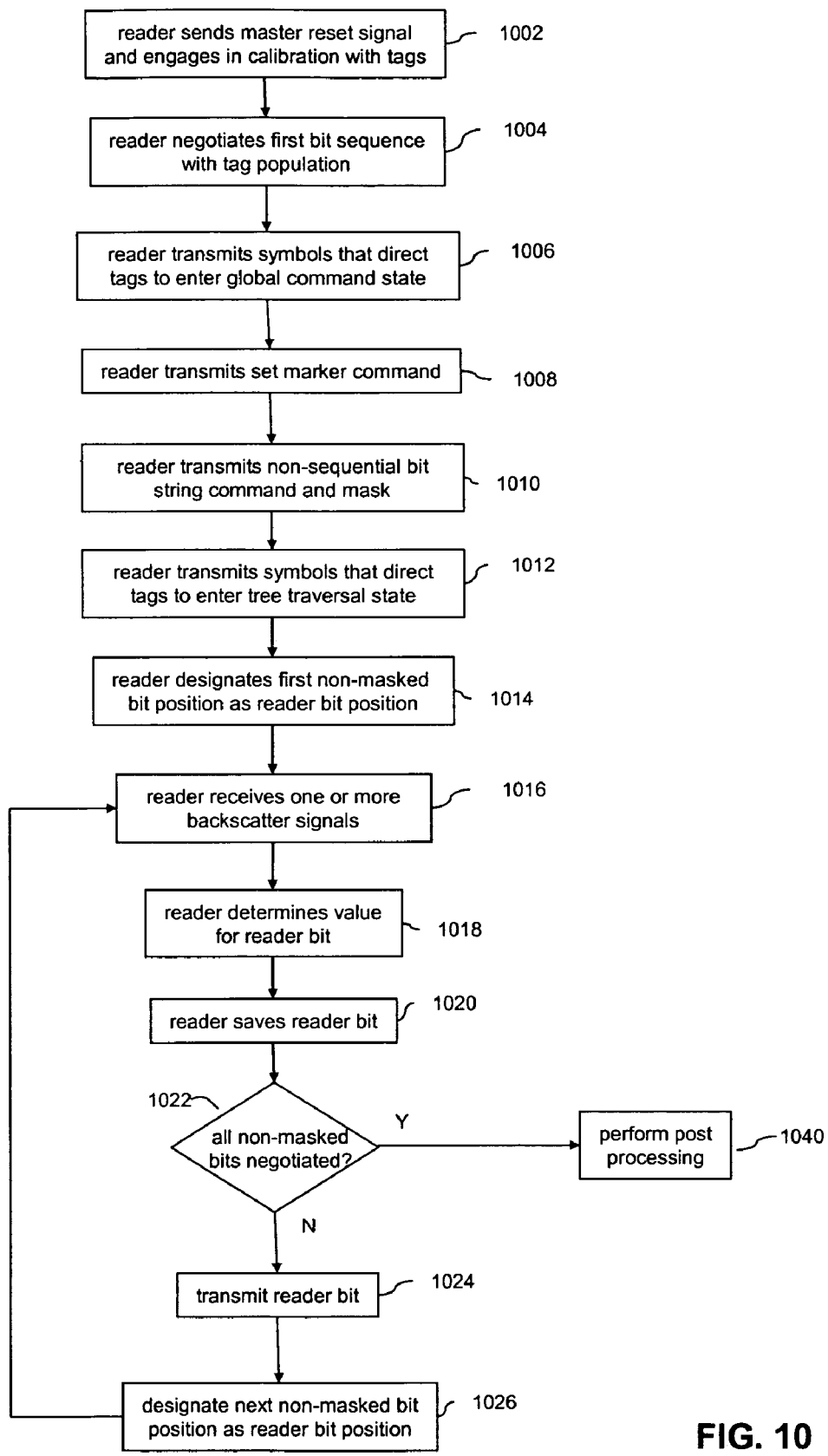
FIG. 10 is a flowchart of a method for performing non-sequential bit string masking using a set marker command in combination with a global mask command from the perspective of a reader, according to an embodiment of the present invention.

FIG. 10 is a flowchart of a method 1000 for performing non-sequential bit string masking using a set marker command in combination with a global mask command from the perspective of a reader, according to an embodiment of the present invention. Flowchart 1000 will be described with continued reference to the exemplary embodiments shown in FIGS. 1, 2, 3, and 6 above. However, the invention is not limited to those embodiments. Note that some steps shown in flowchart 1000 do not necessarily have to occur in the order shown.

Method 1000 begins at step 1002 when reader 104 sends a master reset signal and engages in calibration with a tag population 120.

In step 1004, reader 104 negotiates a first bit sequence with tag population 120. The number of bits in the first bit sequence is less than the number of bits in the tag identification bit sequence. In an embodiment, reader 104 negotiates the first bit sequence using a binary tree traversal interrogation technique. Example interrogation techniques include a general read, specific read, and a group read. The general read and specific read techniques are described above. A group read technique is a hybrid of the specific read and general read techniques.

In step 1006, reader 104 transmits symbols that direct a group of tags (e.g., "matched" or "unmatched") to enter global command state 308. The group of tags can consist of anywhere from zero tags to the entire tag population. For a detailed description of a method of causing a group of tags to enter global command state, see Section 2 above.

In step 1008, reader 104 transmits a set marker command followed by a "NULL" symbol to cause the group of tags 102 in global command state 308 (i.e., "selected tags") to mark a bit position for the start of a subsequent partial binary tree traversal and to direct those tags to transition to global command start state.

In step 1010, reader 104 transmits a non-sequential bit string mask command followed by a mask. For example, the mask can be mask 600 shown in FIG. 6. In an embodiment, the mask is the same length as the number of bits remaining to be negotiated in the tag identification bit sequence. For example, if a tag is identified by a 96-bit sequence and 32 bits were negotiated during binary tree traversal, the received mask is 64 bits.

In step 1012, reader 104 sends one or more symbols causing active tags 102 to enter tree traversal state 312.

During the subsequent tree traversal, reader 104 only negotiates the unmasked bits in the mask. Thus, only a sub-set of the total number of bits identifying the tag is negotiated. For example, if a 64-bit mask was received, reader 104 will negotiate less than 64 bits during the subsequent tree traversal.

In step 1014, reader 104 designates the first non-masked bit position as the reader bit position.

In step 1016, reader 104 receives one or more backscatter symbol responses from the group of tags 120.

In step 1018, reader 104 determines the value for a reader bit associated with the first non-masked bit position by performing a general read interrogation. After receiving the responses from the tags 102, reader 104 determines which binary traversal path (i.e., the value of the bit at the bit position being negotiated) will be taken. To make this determination, if two response signals are received from tags 102, reader 104 may implement a preference for a particular signal. For example, reader 104 may have a preference for the strongest received signal.

In step 1020, reader 104 stores the determined value for the bit.

In step 1022, a determination is made whether all non-masked bits have been negotiated. If all non-masked bits have been negotiated, operation proceeds to step 1040. If non-masked bits remain to be negotiated, operation proceeds to step 1024.

In step 1024, reader 104 transmits the determined reader bit to the group of tags.

In step 1026, reader 104 designates the next non-masked bit position as the reader bit position. Operation then returns to step 1016.

In step 1040, reader 104 may perform some post processing. For example, reader 104 may combine the first negotiated bit string and the negotiated non-masked bits with the masked bit value to generate a complete tag identification bit string. Alternatively, reader 104 may transmit the negotiated bit string and/or the non-masked bit sequence to a separate processor for post processing.

Steps 1016 through 1026 are repeated until all non-masked bits have been negotiated.

Figure 11:
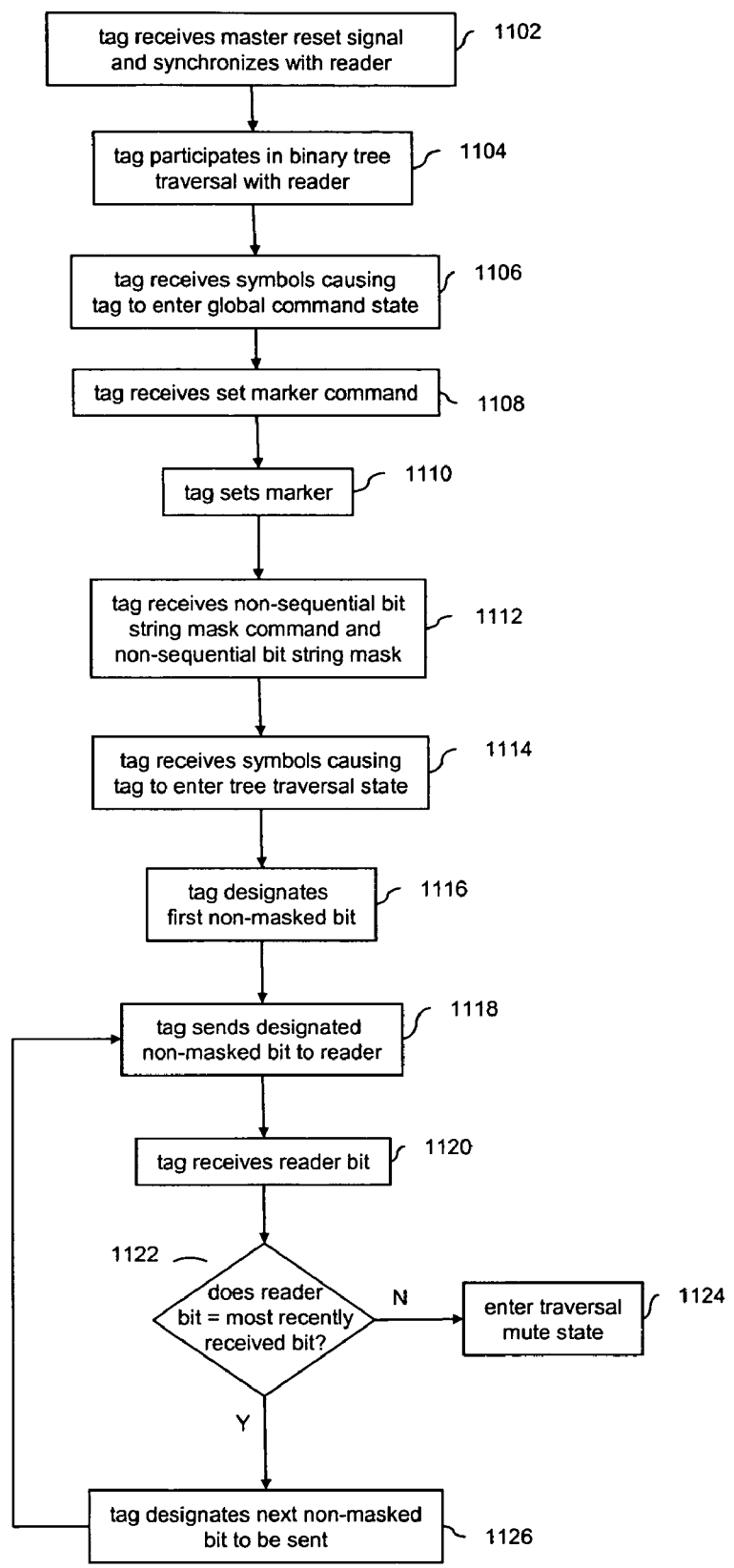
FIG. 11 is a flowchart of a method for performing non-sequential bit string masking using a set marker command and a global non-sequential mask command from the perspective of an individual tag, according to an embodiment of the present invention.

FIG. 11 is a flowchart of a method 1100 for performing non-sequential bit string masking using a set marker command and a global non-sequential mask command from the perspective of an individual tag, according to an embodiment of the present invention. Flowchart 1100 will be described with continued reference to the exemplary embodiments shown in FIGS. 1, 2, 3, and 6 above. However, the invention is not limited to those embodiments. Note that some steps shown in flowchart 1100 do not necessarily have to occur in the order shown.

Method 1100 begins at step 1102 when tag 102 receives a master reset signal from reader 104. Tag 102 is also synchronized with reader 104 in this step.

In step 1104, tag 102 participates in a binary tree traversal with reader 104. In an embodiment, a subset of the tag identification bit sequence is negotiated with reader 104. As a result of this partial binary tree traversal, tag 102 will either be a "matched tag" (i.e., tag 102 successfully negotiated all bits in the partial bit sequence) or "unmatched tag" (i.e., tag 102 did not successfully negotiate a bit in the partial bit sequence).

In step 1106, tag 102 receives symbols causing tag 102 to enter global command state 308. For a detailed description of a method of causing a tag to enter global command state prior to negotiate of a complete tag identification bit sequence, see Section 2 above.

In step 1108, tag 102 tag 102 receives a set marker command from reader 104.

In step 1110, tag 102 sets marker 230 to the appropriate bit position. In an embodiment, marker 230 indicates the first bit position for subsequent binary tree traversal. In cases where the marker is not placed at the first bit position of the identification bit sequence, any subsequent binary tree traversal is a traversal of subset of the binary tree (i.e., a partial binary tree traversal).

In step 1112, tag 102 receives a non-sequential mask command followed by a mask. For example, the mask can be mask 600 shown in FIG. 6. In an embodiment, the mask is the same length as the length of the remaining bits of the tag identification bit sequence. For example, for a 96 bit identification sequence, if 32 bits were negotiated during binary tree traversal in step 1104, the received mask is 64 bits. As would be appreciated by persons of skill in the art, the mask could be less than 64 bits.

In step 1114, tag 102 receives symbols causing tag 102 to enter tree traversal state. During the subsequent tree traversal, tag 102 only negotiates the unmasked bits in the received mask. Thus, only a sub-set of the remaining bits in the tag identification sequence are negotiated.

In step 1116, tag 102 designates a first non-masked bit for transmission to the reader. For example, in FIG. 6, the first non-masked bit is the bit in bit position 4.

In step 1118, tag 102 transmits the non-masked bit to reader 104.

In step 1120, tag 102 receives a bit from reader 104.

In step 1122, tag 102 determines whether the received reader bit equals the bit most recently transmitted to the reader. If the reader bit matches the transmitted bit, operation proceeds to step 1126. If the reader bit does not match the most recent transmitted bit, operation proceeds to step 1124.

In step 1126, tag 102 designates the next non-masked bit for transmission to the reader. Operation then returns to step 1118.

In step 1124, tag 102 enters mute state.

Steps 1118 through 1126 are repeated until all non-masked bits have been negotiated with the reader.

4. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a radio frequency identification (RFID) reader for interrogating an RFID tag population having a plurality of tags, comprising the steps of:
   (a) transmitting an interrogation mask corresponding to a tag identification sequence to the RFID tag population, wherein the interrogation mask has a plurality of sub-masks that are non-sequentially positioned in the mask and wherein each sub-mask covers at least one bit position; and
   (b) performing an abbreviated collection of unmasked bits of the identification sequence from one or more tags in the tag population.

2. The method of claim 1, further comprising: determining the interrogation mask using superposition processing.

3. The method of claim 2, further comprising: determining a value for a bit in each masked bit position.

4. The method of claim 1, wherein step (b) includes performing a binary tree traversal to collect the unmasked bits in the identification sequence.

5. The method of claim 4, wherein step (b) further comprises:
   (i) transmitting one or more symbols that cause one or more tags in the tag population to engage in binary tree traversal and to transmit a first unmasked bit;
   (ii) receiving one or more symbols from the one or more tags;
   (iii) determining whether a current bit position in a tag identification sequence being negotiated is a masked bit position;
   (iv) if the current bit position is a masked bit position, saving the value for the bit determined during superposition processing;
   (v) if the current bit position is not a masked bit position, determining a value for the bit using binary tree traversal processing, saving the value of the bit, and transmitting the value to the tag population; and
   (vi) repeating steps (i) through (v) for each bit position in the identification sequence.

6. The method of claim 3, wherein step (b) further comprises:
   (i) transmitting one or more symbols that cause one or more tags in the tag population to engage in binary tree traversal and to transmit its first unmasked bit;
   (ii) receiving one or more symbols from the one or more tags;
   (iii) determining whether a current bit position in a tag identification sequence being negotiated is a masked bit position;
   (iv) if the current bit position is a masked bit position, designating the next bit position as the current bit position;
   (v) if the current bit position is not a masked bit position, determining a value for the bit using binary tree traversal processing, saving the value of the bit, transmitting the value to the tag population, and designating the next bit position as the current bit position;
   (vi) repeating steps (i) through (v) for each bit position in the identification sequence; and
   (vii) generating a complete identification sequence based on the determined bit values, the interrogation mask, and the values of the bit positions determined during superposition processing.

7. The method of claim 2, wherein the determining step includes:
   (A) transmitting symbols that direct one or more tags in the tag population to engage in superposition processing and to send the value of a bit in a first position of the identification sequence;
   (B) receiving one or more symbols from tags associated with a current bit position in the identification sequence;
   (C) if a plurality of symbols is received in step (B), designating the current bit position as unmasked;
   (D) if a single symbol is received in step (B), designating the current bit position as masked;
   (E) transmitting one or more symbols that direct each tag in the tag population to send the value of the bit in a next position of the identification sequence; and
   (F) repeating steps (B)-(E) for each bit position in the identification sequence.

8. The method of claim 1, wherein step (a) includes:
   (i) transmitting symbols that direct one or more tags in the tag population to engage in superposition processing and to send the value of a bit in a first position of the identification sequence;
   (ii) receiving one or more symbols associated with a current bit position in the identification sequence;
   (iii) if a plurality of symbols is received in step (ii), designating the current bit position as unmasked and transmitting a value to cause the one or more tags in the tag population to not mask the current bit position;
   (iv) if a single symbol is received in step (ii), designating the current bit position as masked and transmitting a value to cause the one or more tags in the tag population to mask the current bit position; and
   (v) repeating steps (ii)-(iv) for each bit position in the identification sequence.

9. The method of claim 1, wherein step (a) further includes:
   (i) transmitting symbols that direct one or more tags to transition to a state for receiving reader commands; and
   (ii) transmitting a non-sequential mask command including an interrogation mask.

10. The method of claim 9, wherein the non-sequential mask command further includes a memory bank identifier.

11. The method of claim 1, wherein step (b) includes using a slot based protocol to collect the unmasked bits in the identification sequence for one or more tags in the tag population.

12. The method of claim 11, wherein step (b) includes:
   (i) transmitting one or more messages to cause one or more tags in the tag population to transition to a reply state; and
   (ii) transmitting one or more messages to cause each of the one or more tags to transmit the unmasked bits of its identification sequence in a message during a reply slot.

13. A method in a radio frequency identification (RFID) tag for communicating with a reader, comprising the steps of:
   (a) receiving an interrogation mask corresponding to a tag identification sequence to the RFID tag population, wherein the interrogation mask has a plurality of non-sequential sub-masks that are non-sequentially positioned in the mask and wherein each sub-mask covers at least one bit position; and
   (b) performing an abbreviated collection of unmasked bits of the identification sequence.

14. The method of claim 13, wherein step (b) includes performing a binary tree traversal to transmit each unmasked bit of the identification sequence.

15. The method of claim 13, wherein step (b) includes:
   (i) transitioning to a reply state upon receipt of one or more messages; and
   (ii) transmitting the unmasked bits of the identification sequence in a message during a reply slot.

16. The method of claim 14, wherein step (b) further comprises:
   (i) designating a first non-masked bit position as a current bit position;
   (ii) transmitting a bit stored in the current bit position;
   (iii) receiving a symbol;
   (iv) determining whether the received symbol has the same value as the transmitted bit;
   (v) if the received symbol has the same value as the transmitted bit, designating a next non-masked bit position as the current bit position and repeating steps (ii) through (iv) for each remaining non-masked bit position; and
   (vi) if the received symbol does not have the same value as the transmitted bit, transitioning to a traversal mute state.

17. The method of claim 13, wherein step (a) includes:
   (i) receiving one or more symbols causing the tag to perform superposition processing;
   (ii) designating first bit position of the tag identification sequence as a current bit position;
   (iii) transmitting the bit in current bit position;
   (iv) receiving a reader bit;
   (v) if the reader bit has a first value, designating the current bit position as masked;
   (vi) if the reader bit has a second value, designating the current bit position as unmasked; and
   (vii) repeating steps (iii)-(vi) for each bit position in the identification sequence.

18. The method of claim 13, wherein step (a) includes:
   (i) receiving one or more symbols causing the tag to transition to a state for receiving commands; and
   (ii) receiving a non-sequential mask command including the interrogation mask.

19. The method of claim 18, wherein the non-sequential mask command further includes a memory bank identifier.

20. A method in a radio frequency identification (RFID) reader for interrogating an RFID tag population, comprising the steps of:
   (a) determining an interrogation mask, wherein the interrogation mask has a plurality of non-sequential sub-masks that are non-sequentially positioned in the mask and wherein each sub-mask covers at least one bit position;
   (b) transmitting symbols that direct the tag population to transition to a state for receiving reader commands;
   (c) transmitting a non-sequential mask command followed by the interrogation mask;
   (d) transmitting symbols that direct the tag population to a state for engaging in a binary tree traversal interrogation; and
   (e) performing binary tree traversal to read the non-masked bit positions, wherein the non-masked bit positions are not covered by the sub-masks of the mask.

21. The method of claim 20, wherein step (a) comprises:
   (i) transmitting symbols that direct the tag population to engage in superposition processing;
   (ii) determining one or more bit positions in the tag identification sequence having a single value for each tag in the tag population; and
   (iii) masking each bit position having the single value.

* * * * *

UNITED STATES PATENT AND TRADEMARK OFFICE
CERTIFICATE OF CORRECTION

| | | |
|---|---|---|
| PATENT NO. | : 7,425,888 B2 | Page 1 of 1 |
| APPLICATION NO. | : 11/192373 | |
| DATED | : September 16, 2008 | |
| INVENTOR(S) | : Powell | |

It is certified that error appears in the above-identified patent and that said Letters Patent is hereby corrected as shown below:

IN THE DRAWINGS

In Fig. 15, Sheet 15 of 15, delete " 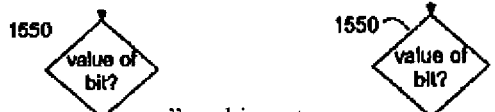 " and insert -- -- , therefor.

In Column 10, Line 4, delete "Population,"." and insert -- Population". --, therefor.

In Column 27, Line 26, in Claim 17, after "designating" insert -- a --.

Signed and Sealed this
Fourth Day of October, 2011

David J. Kappos
*Director of the United States Patent and Trademark Office*